US012581521B2

(12) United States Patent
Liu et al.

(10) Patent No.: US 12,581,521 B2
(45) Date of Patent: Mar. 17, 2026

(54) CHANNEL SOUNDING AND RADAR SENSING ANTENNA SWITCHING

(71) Applicant: QUALCOMM Incorporated, San Diego, CA (US)

(72) Inventors: Kangqi Liu, San Diego, CA (US); Weimin Duan, San Diego, CA (US); Jing Jiang, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 18/180,354

(22) Filed: Mar. 8, 2023

(65) Prior Publication Data

US 2024/0306173 A1 Sep. 12, 2024

(51) Int. Cl.
*H04W 72/51* (2023.01)
*G01S 7/40* (2006.01)
*H04B 7/06* (2006.01)

(52) U.S. Cl.
CPC ........... *H04W 72/51* (2023.01); *G01S 7/4004* (2013.01); *H04B 7/0608* (2013.01)

(58) Field of Classification Search
CPC ....... H04W 8/24; H04W 72/51; H04W 88/06; H04W 72/512; G01S 13/34; G01S 7/006; G01S 7/0235; G01S 7/4004; G01S 13/003; H04B 7/0608
See application file for complete search history.

(56) References Cited

U.S. PATENT DOCUMENTS

| | | | |
|---|---|---|---|
| 2021/0392516 A1 | 12/2021 | Park et al. | |
| 2022/0232524 A1* | 7/2022 | Kaikkonen | ........... H04W 72/02 |
| 2023/0076874 A1* | 3/2023 | Jeon | ..................... H04B 17/309 |
| 2023/0362898 A1* | 11/2023 | Jeon | ..................... G01S 7/0235 |

(Continued)

FOREIGN PATENT DOCUMENTS

| | | |
|---|---|---|
| KR | 20230032994 A | 3/2023 |
| WO | 2021028057 A1 | 2/2021 |

OTHER PUBLICATIONS

U.S. Appl. No. 63/337,865,Specification, filed May 3, 2022 (Year: 2022).*

(Continued)

*Primary Examiner* — Ji-Hae Yea
(74) *Attorney, Agent, or Firm* — QUALCOMM Incorporated

(57) ABSTRACT

A signal transfer method for communication, radar sensing, or a combination thereof, includes: transmitting, from a UE, a capability message indicating a capability of the UE to perform antenna switching for radar signal transmission and for communication signal transmission; receiving, at the UE from a network entity, a configuration message indicating a radar signal transmission configuration, or a communication signal transmission configuration, or a combination thereof; and transmitting, from the UE, one or more outbound signals, the one or more outbound signals comprising a radar signal in accordance with the radar signal transmission configuration, or comprising a communication signal in accordance with the communication signal transmission configuration, or a combination thereof.

27 Claims, 14 Drawing Sheets

(56) References Cited

U.S. PATENT DOCUMENTS

2024/0348388 A1 * 10/2024 Lindoff ................... H04W 8/24
2025/0008538 A1 * 1/2025 Sun ....................... H04L 5/0092

OTHER PUBLICATIONS

U.S. Appl. No. 63/338,491, Specification, filed May 5, 2022 (Year: 2022).*
International Search Report and Written Opinion—PCT/US2024/014190—ISA/EPO—May 28, 2024.
Zhang J.A., et al., "Enabling Joint Communication and Radar Sensing in Mobile Networks—A Survey", IEEE Communications Surveys Tutorials, IEEE, vol. 24, No. 1, Oct. 25, 2021, pp. 306-345, First Quarter 2022, XP011901326, II. Three Types of JCAS Systems, III. Framework for a PMN, IV. Evolution: System Modifications to Enable Sensing, V. Major Research Challenges for PMN, VI. Detailed Technologies and Open Research Problems.

* cited by examiner

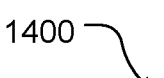

1400

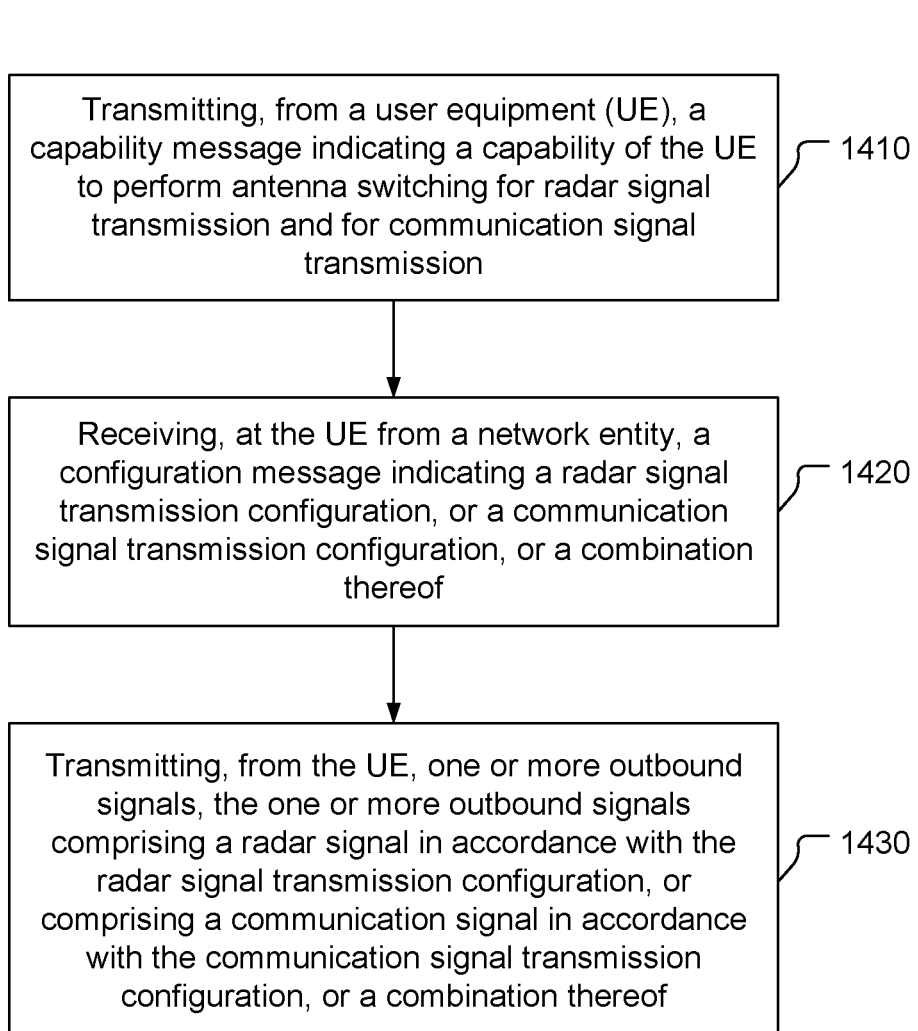

Transmitting, from a user equipment (UE), a capability message indicating a capability of the UE to perform antenna switching for radar signal transmission and for communication signal transmission — 1410

Receiving, at the UE from a network entity, a configuration message indicating a radar signal transmission configuration, or a communication signal transmission configuration, or a combination thereof — 1420

Transmitting, from the UE, one or more outbound signals, the one or more outbound signals comprising a radar signal in accordance with the radar signal transmission configuration, or comprising a communication signal in accordance with the communication signal transmission configuration, or a combination thereof — 1430

FIG. 14

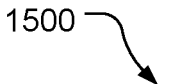

1500

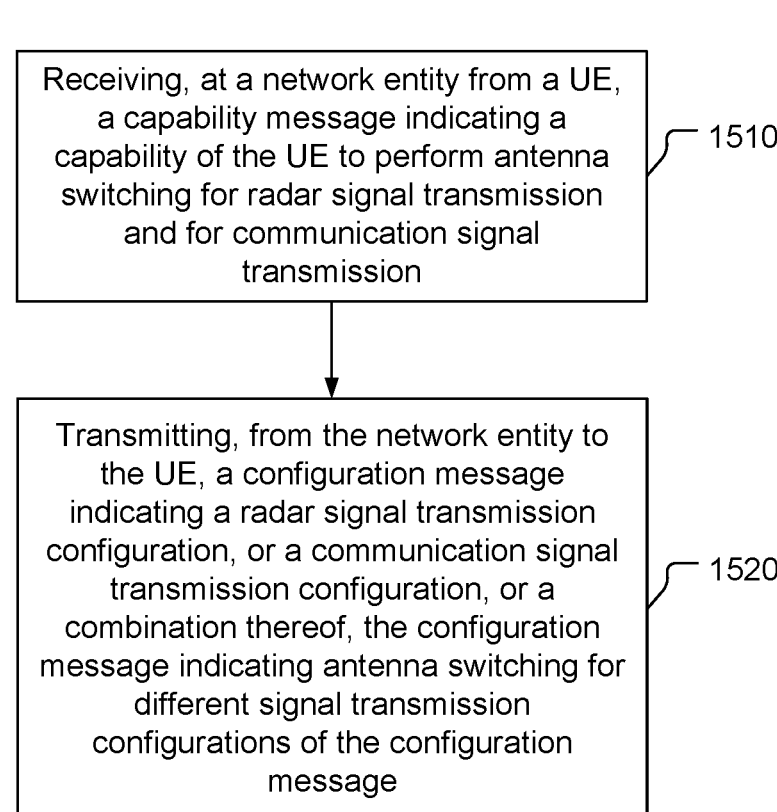

Receiving, at a network entity from a UE, a capability message indicating a capability of the UE to perform antenna switching for radar signal transmission and for communication signal transmission ⟩⎯ 1510

Transmitting, from the network entity to the UE, a configuration message indicating a radar signal transmission configuration, or a communication signal transmission configuration, or a combination thereof, the configuration message indicating antenna switching for different signal transmission configurations of the configuration message ⟩⎯ 1520

FIG. 15

CHANNEL SOUNDING AND RADAR SENSING ANTENNA SWITCHING

BACKGROUND

Wireless communication systems have developed through various generations, including a first-generation analog wireless phone service (1G), a second-generation (2G) digital wireless phone service (including interim 2.5G and 2.7 5G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

In addition to communication capabilities of devices (e.g., mobile devices), obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points.

SUMMARY

An example user equipment (UE) includes: a memory; a transceiver; and a processor, communicatively coupled to the memory and the transceiver, configured to: transmit, via the transceiver, a capability message indicating a capability of the UE to perform antenna switching for radar signal transmission and for communication signal transmission; receive, via the transceiver from a network entity, a configuration message indicating a radar signal transmission configuration, or a communication signal transmission configuration, or a combination thereof; and transmit, via the transceiver, one or more outbound signals, the one or more outbound signals comprising a radar signal in accordance with the radar signal transmission configuration, or comprising a communication signal in accordance with the communication signal transmission configuration, or a combination thereof.

An example signal transfer method for communication, radar sensing, or a combination thereof, includes: transmitting, from a user equipment (UE), a capability message indicating a capability of the UE to perform antenna switching for radar signal transmission and for communication signal transmission; receiving, at the UE from a network entity, a configuration message indicating a radar signal transmission configuration, or a communication signal transmission configuration, or a combination thereof; and transmitting, from the UE, one or more outbound signals, the one or more outbound signals comprising a radar signal in accordance with the radar signal transmission configuration, or comprising a communication signal in accordance with the communication signal transmission configuration, or a combination thereof.

Another example UE includes: means for transmitting a capability message indicating a capability of the UE to perform antenna switching for radar signal transmission and for communication signal transmission; means for receiving, from a network entity, a configuration message indicating a radar signal transmission configuration, or a communication signal transmission configuration, or a combination thereof; and means for transmitting one or more outbound signals, the one or more outbound signals comprising a radar signal in accordance with the radar signal transmission configuration, or comprising a communication signal in accordance with the communication signal transmission configuration, or a combination thereof.

An example non-transitory, processor-readable storage medium includes processor-readable instructions to cause a processor of a UE to: transmit a capability message indicating a capability of the UE to perform antenna switching for radar signal transmission and for communication signal transmission; receive, from a network entity, a configuration message indicating a radar signal transmission configuration, or a communication signal transmission configuration, or a combination thereof; and transmit one or more outbound signals, the one or more outbound signals comprising a radar signal in accordance with the radar signal transmission configuration, or comprising a communication signal in accordance with the communication signal transmission configuration, or a combination thereof.

An example network entity includes: a memory; a transceiver; and a processor, communicatively coupled to the memory and the transceiver, configured to: receive, via the transceiver from a UE, a capability message indicating a capability of the UE to perform antenna switching for radar signal transmission and for communication signal transmission; and transmit, via the transceiver to the UE, a configuration message indicating a radar signal transmission configuration, or a communication signal transmission configuration, or a combination thereof, the configuration message indicating antenna switching for different signal transmission configurations of the configuration message.

An example method for transmitting signal configuration information for communication, radar sensing, or a combination thereof, includes: receiving, at a network entity from a UE, a capability message indicating a capability of the UE to perform antenna switching for radar signal transmission and for communication signal transmission; and transmitting, from the network entity to the UE, a configuration message indicating a radar signal transmission configuration, or a communication signal transmission configuration, or a combination thereof, the configuration message indicating antenna switching for different signal transmission configurations of the configuration message.

Another example network entity includes: means for receiving, from a UE, a capability message indicating a capability of the UE to perform antenna switching for radar signal transmission and for communication signal transmission; and means for transmitting, to the UE, a configuration message indicating a radar signal transmission configuration, or a communication signal transmission configuration, or a combination thereof, the configuration message indicating antenna switching for different signal transmission configurations of the configuration message.

Another example non-transitory, processor-readable storage medium includes processor-readable instructions to cause a processor of a network entity to: receive, from a UE, a capability message indicating a capability of the UE to perform antenna switching for radar signal transmission and for communication signal transmission; and transmit, to the UE, a configuration message indicating a radar signal transmission configuration, or a communication signal transmission configuration, or a combination thereof, the configuration message indicating antenna switching for different signal transmission configurations of the configuration message.

BRIEF DESCRIPTION OF THE DRAWINGS

FIG. 14 is a block flow diagram of a signal transfer method for communication, radar sensing, or a combination thereof.

FIG. 15 is a block flow diagram of a method for transmitting signal configuration information for communication, radar sensing, or a combination thereof.

DETAILED DESCRIPTION

Figure 1:
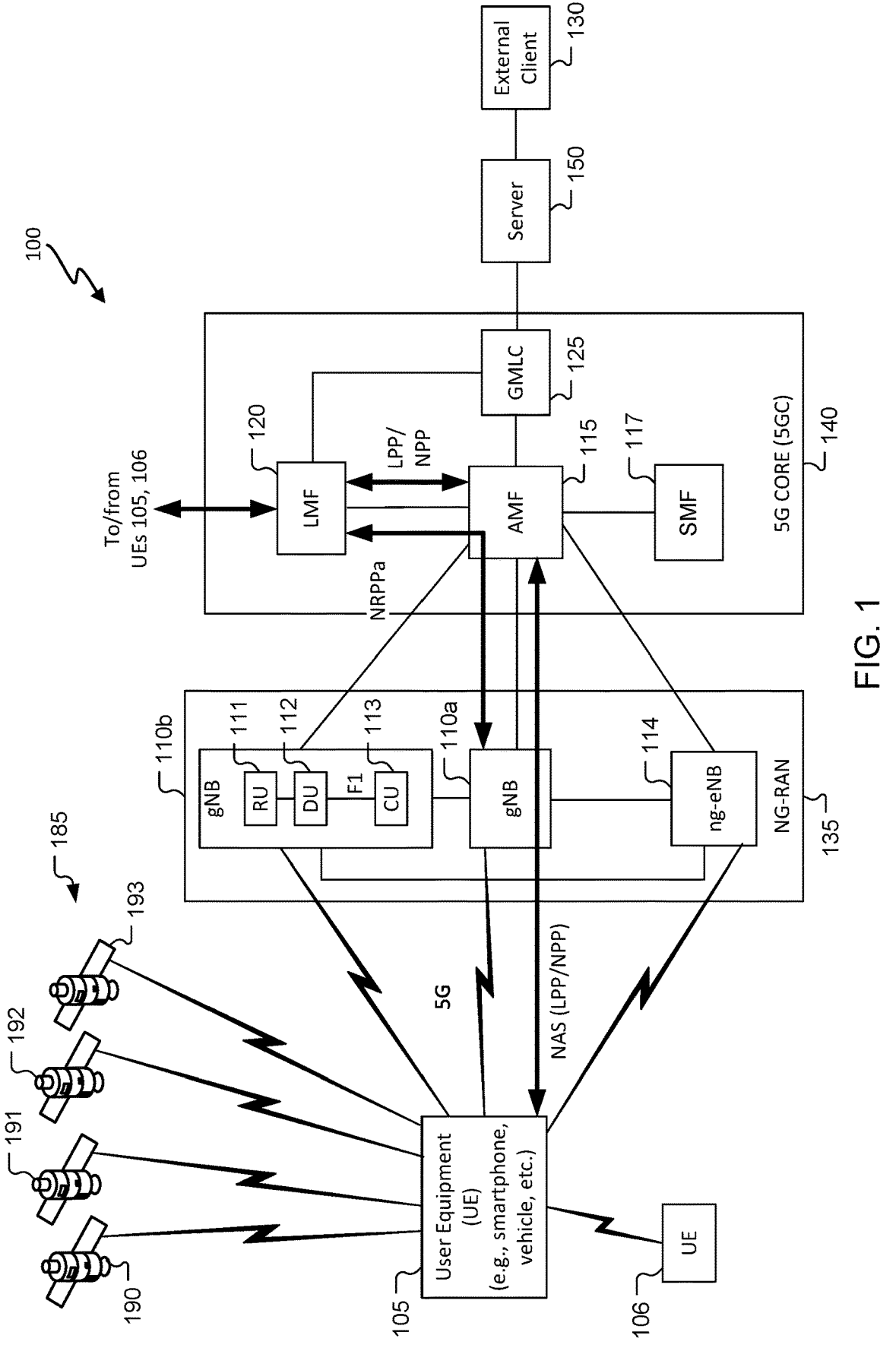
FIG. 1 is a simplified diagram of an example wireless communications system.

Techniques are discussed herein for antenna switching based communication (channel sounding) and radar sensing.

For example, techniques are discussed for joint channel sounding and radar sensing, channel sounding alone, or radar sensing alone. For radar sensing, both monostatic and bi-static radar sensing are discussed, e.g., TDM MIMO radar sensing (Time Division Multiplexed Multiple Input Multiple output radar sensing). For example, a user equipment (UE) may inform a network entity (e.g., a gNB) as to one or more capabilities of the UE regarding channel sounding and/or radar sensing, e.g., one or more parameters for one or more signal configurations supported by the UE for antenna switching for channel sounding and/or radar sensing. A network entity may provide, based on the indicated UE capability(ies), one or more signal configurations for the UE to use to perform channel sounding and/or radar sensing. The UE may transmit one or more signals in accordance with the received configuration(s) and a network entity may receive one or more channel sounding signals and/or one or more bi-static radar sensing signals (which may be shared with the channel sounding). Other configurations, however, may be used.

Items and/or techniques described herein may provide one or more of the following capabilities, as well as other capabilities not mentioned. Channel sounding and/or radar sensing may be supported with antenna switching, which may help improve channel sounding and/or radar sensing performance. Signal traffic may be conserved by using a signal for both communication and radar sensing. Signals for communication and/or radar sensing may be configured based on UE capability(ies) which may help ensure and/or improve communication and/or radar sensing performance based on signal transmission by the UE. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station." a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-cNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller)

number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-cNB (cNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-cNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-cNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-cNB 114 may provide LTE wireless access and/or evolved LTE (ELTE) wireless access to the UE 105. One or more of the gNBs 110a. 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150.

The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a. 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
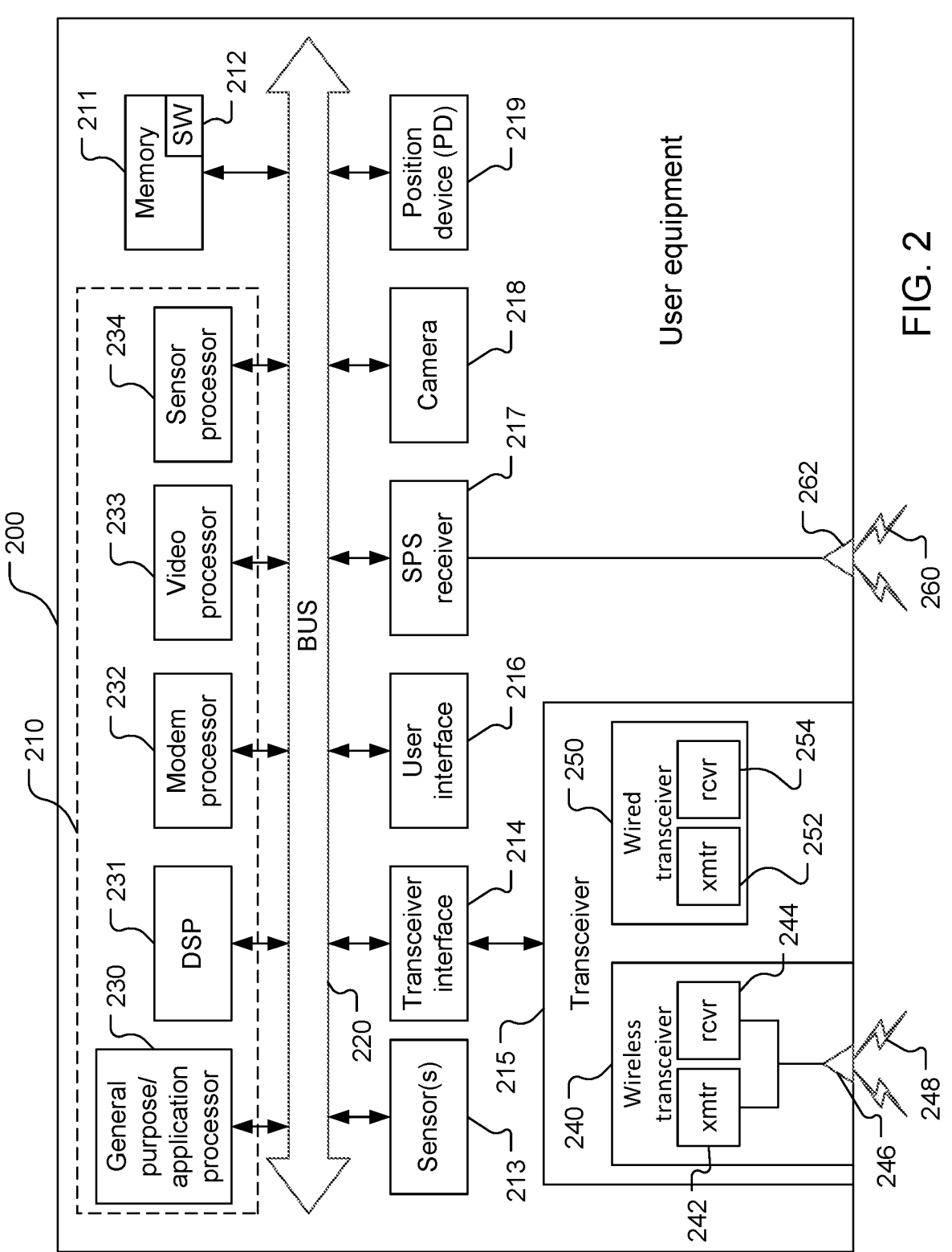
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200.

The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
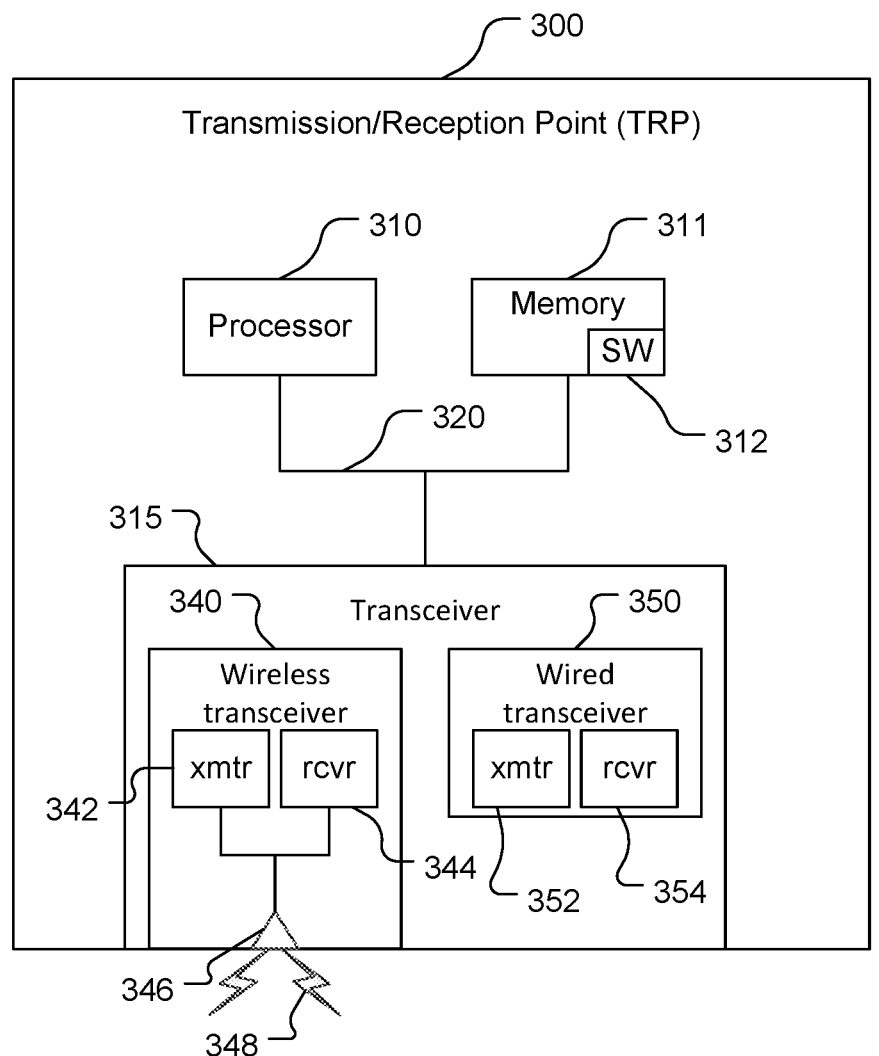
FIG. 3 is a block diagram of components of an example transmission/reception point shown in FIG. 1.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
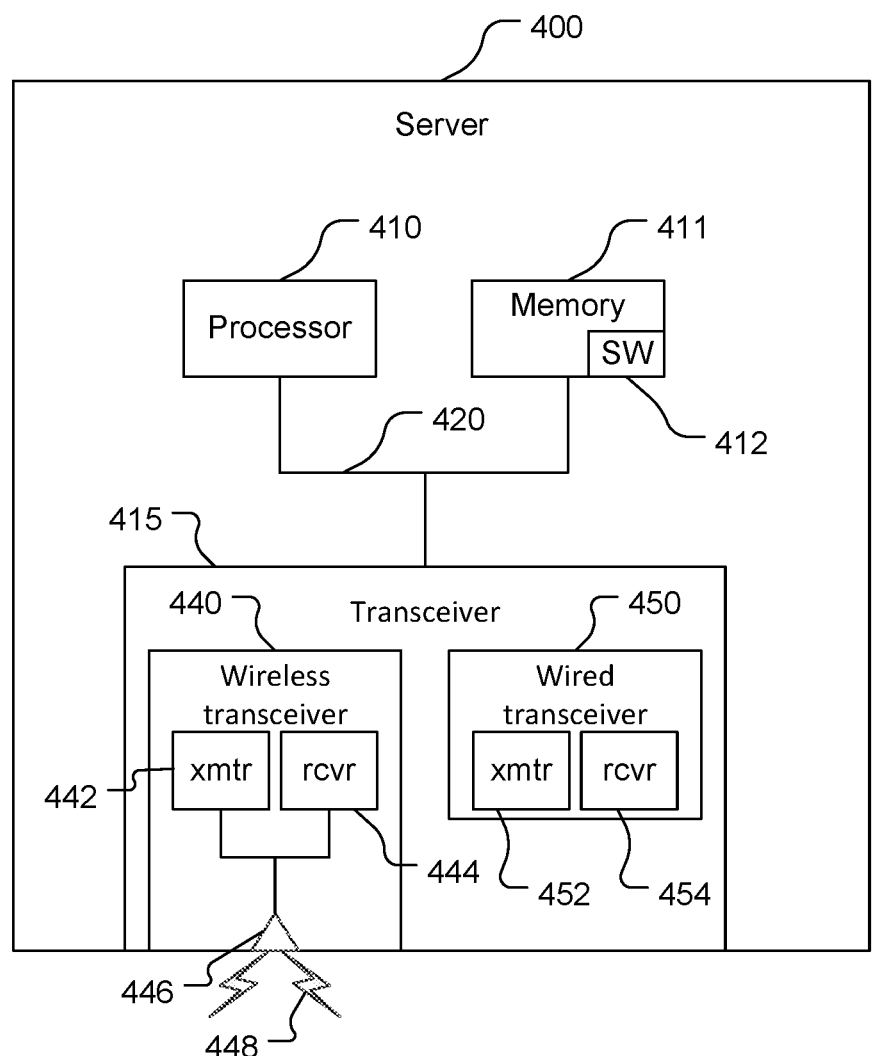
FIG. 4 is a block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference TRx-Tx (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference TTx-Rx between the transmission time of the RTT measurement signal from the base station and the ToA of the RTT response at the base station to the UE-reported time difference TRx-Tx, and subtracting the UERx-Tx, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-Positioning FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
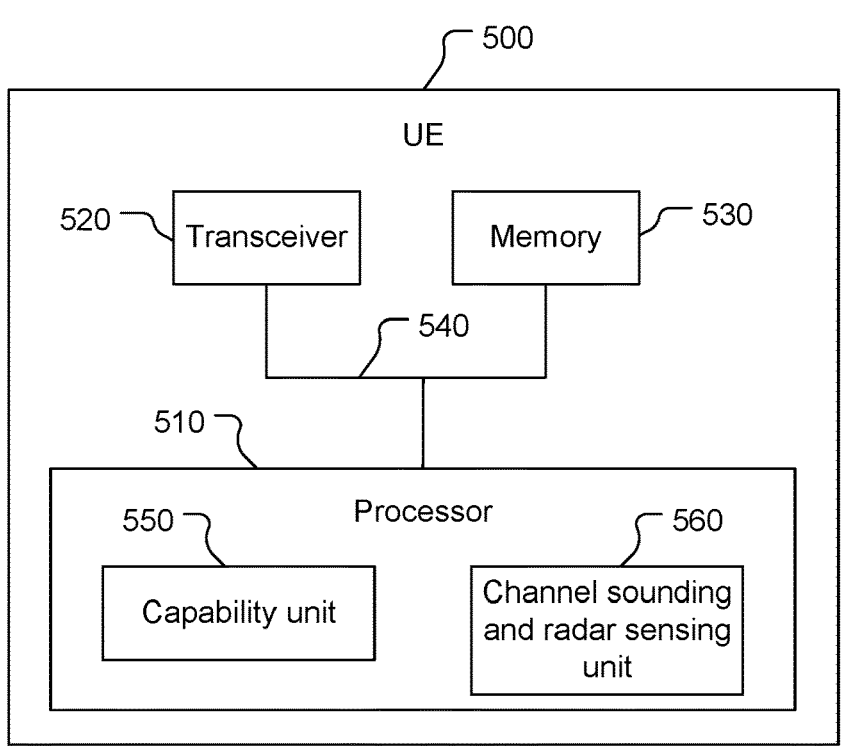
FIG. 5 is a block diagram of an example user equipment.

Referring also to FIG. 5, a UE 500 includes a processor 510, a transceiver 520, and a memory 530 communicatively coupled to each other by a bus 540. The UE 500 may include the components shown in FIG. 5. The UE 500 may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a capability unit 550 and a channel sounding and radar sensing unit 560 (also called a sounding/sensing unit 560). The capability unit 550 and the sounding/sensing unit 560 are discussed further below, and the description may refer to the processor 510 generally, or the UE 500 generally, as performing any of the functions of the capability unit 550 and/or the sounding/sensing unit 560, with the UE 500 being configured to perform the function(s).

Figure 6:
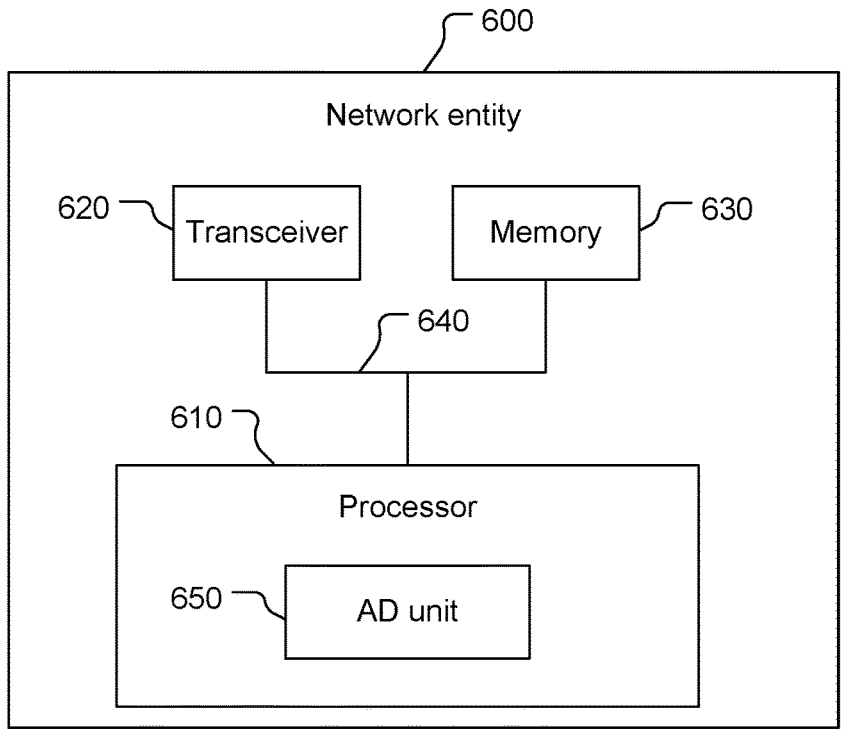
FIG. 6 is a block diagram of an example network entity.

Referring also to FIG. 6, a network entity 600 includes a processor 610, a transceiver 620, and a memory 630 communicatively coupled to each other by a bus 640. The network entity 600 may include the components shown in FIG. 6. The network entity 600 may include one or more other components such as any of those shown in FIG. 4 such that the server 400 may be an example of the network entity 600. For example, the processor 610 may include one or more of the components of the processor 410. The transceiver 620 may include one or more of the components of the transceiver 415. The memory 630 may be configured similarly to the memory 411, e.g., including software with processor-readable instructions configured to cause the processor 610 to perform functions. Also or alternatively, the network entity 600 may include one or more other components such as any of those shown in FIG. 3 such that the TRP 300 may be an example of the network entity 600. For example, the processor 610 may include one or more of the components of the processor 310. The transceiver 620 may include one or more of the components of the transceiver 315. The memory 630 may be configured similarly to the memory 311, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include an AD unit 650 (Assistance Data unit). The AD unit 650 is discussed further below, and the description may refer to the processor 610 generally, or the network entity 600 generally, as performing any of the functions of the AD unit 650, with the network entity 600 being configured to perform the function(s).

Figure 7:
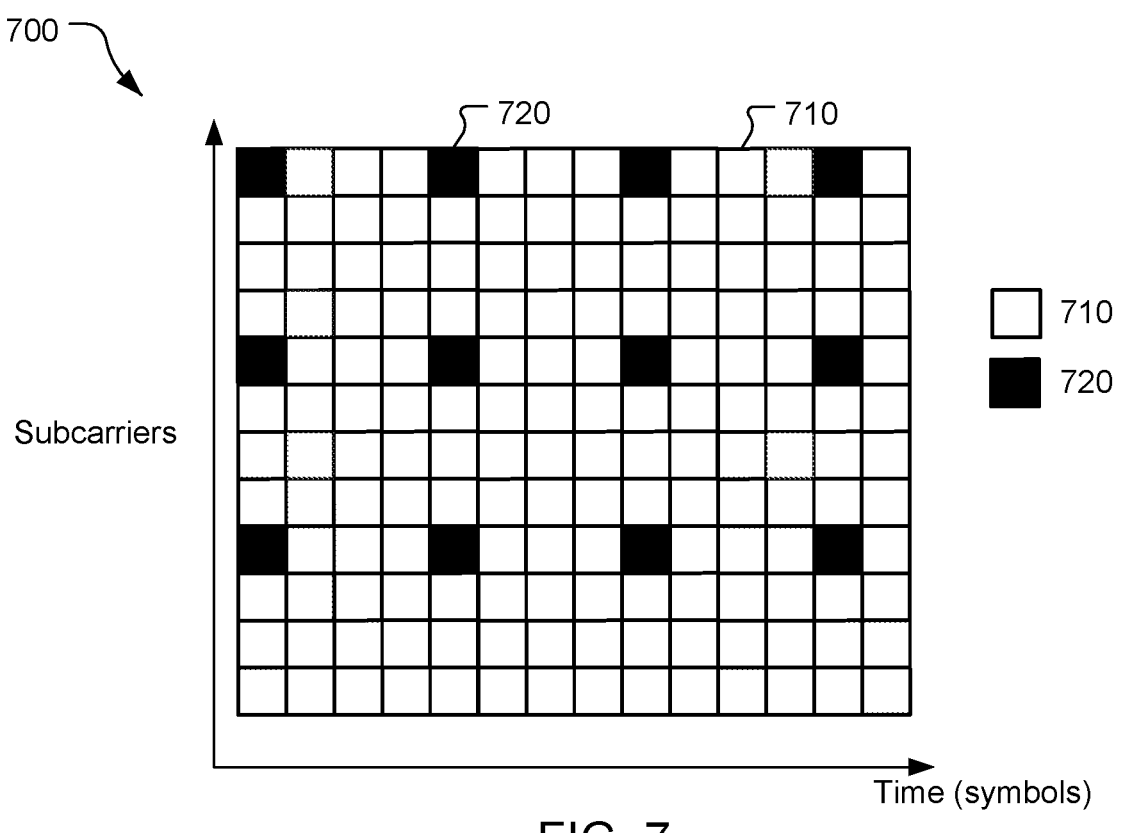
FIG. 7 is a transmission patter diagram of OFDM resource elements for communication and radar sensing.

Bandwidth allocations for cellular communication systems (e.g., 5G and 5G+) have become larger over the years and use cases have been and continue to be introduced for cellular communication systems (e.g., such as the communication system 100). In view of this, joint communication/ RF sensing (JCS) may be a useful feature in communication systems (e.g., present and/or future systems such as 6th generation (6G) communication systems). In JCS, a system may perform wireless communication and radar sensing using the same signal, which may provide a cost-efficient deployment for both radar and communication. A waveform (e.g., FMCW (Frequency Modulated Continuous Wave)) of the radar-RS signal may be the same as or different from a waveform (e.g., OFDM), of the communication signal. In a JCS system, time, frequency, and spatial radio resources may be allocated to support communication and sensing in an integrated system. In a system without joint operation of communication and radar sensing, the same signal (e.g., the same time/frequency resource) is not used for sensing and communications, e.g., radar signals and communication signals may be time division multiplexed and/or frequency division multiplexed. For example, radar signals, downlink communication signals, and uplink communication signals may be transferred at different times and/or with different frequencies. For example, referring to FIG. 7, an example OFDM transmission schedule 700 shows that a downlink communication signal may be sent using downlink tones 710 that are TDM/FDM with a radar reference signal being sent over radar RS tones 720. A radar sensing system sends probing signals to target objects (which may be uncooperative objects, not communicating with a device transmitting the probing signals), and infers useful information from echoes of the probing signals reflected by the target objects. In a communication system, information is transferred between two or more cooperative devices (e.g., between a transmitter and a receiver, between two transceivers, etc.).

Figure 8:
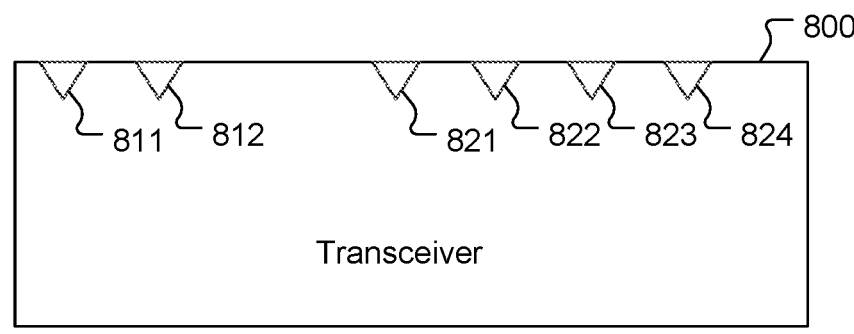
FIG. 8 is a block diagram of antennas of a transceiver.

The UE 500 may be configured for use in non-coherent MIMO (Multiple Input Multiple Output) radar and/or coherent MIMO radar. For example, the transceiver 520 may include one or more antennas that may be used to transmit non-coherent radar signals as part of a non-coherent MIMO radar system that provides spatial diversity. Non-coherent MIMO radar may use spatial diversity gain and may provide multi-static sensing (e.g., bi-static sensing with paired Tx/Rx). As another example, referring also to FIG. 8, a transceiver 800, which is an example of the transceiver 520, may include multiple transmit antennas 811, 812 and multiple receive antennas 821, 822, 823, 824. The quantities of antennas shown in FIG. 8 is an example, and other quantities of transmit antennas and/or other quantities of receive antennas may be used. Also, one or more antennas may be used for transmit and receive.

Angular resolution in radar is related to aperture size of a transmit antenna array. Consequently, multiple antennas (e.g., for coherent MIMO radar) may be used to increase the aperture size and thus the angular resolution. Using multiple transmit antennas involves transmitting orthogonal signals. The transmitted signals may be orthogonal using time-division multiplexing (TDM), frequency-division multiplexing (FDM), and/or code-division multiplexing (CDM). In TDM MIMO, different transmit antennas transmit signals at different times. Different antennas may be disposed at different locations within the UE 500, thus having different channels between the UE 500 and the network entity 600, e.g., a TRP such as a gNB. Different antennas may be connected to different front-end circuits and/or may have different characteristics, e.g., gains, beamwidths, and/or frequencies of operation, etc.

As discussed herein, the UE 500 and the network entity 600 may be configured to provide antenna switching based channel sounding and radar sensing, e.g., in a cellular communication system (e.g., 5G, 5G+(e.g., 6G)). For example, waveform types are discussed for channel sounding and radar sensing. As another example, antenna switching is discussed for channel sounding and TDM MIMO radar sensing, e.g., joint channel sounding and radar sensing. As another example, timing gaps are discussed, e.g., for joint channel sounding and TDM MIMO monostatic radar sensing, and for separate channel sounding and radar sensing signals. As another example, signaling and procedures are discussed for channel sounding and TDM MIMO monostatic radar sensing (with coherent MIMO radar or non-coherent MIMO radar being able to be used for monostatic radar sensing). As another example, signaling and procedures are discussed for channel sounding and TDM MIMO bi-static radar sensing (with non-coherent MIMO radar being able to be used for bi-static radar sensing).

Figure 9:
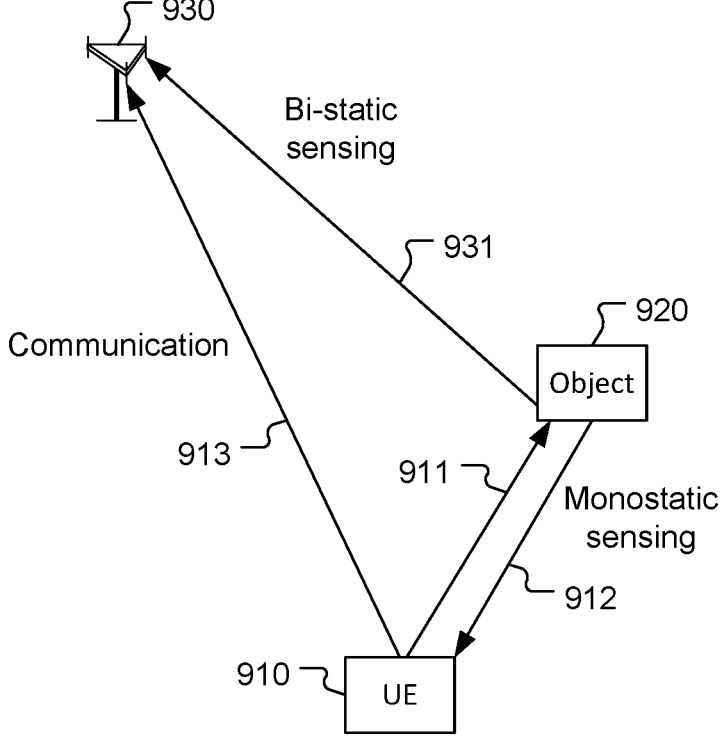
FIG. 9 is a block diagram of a system for communication and (monostatic and/or bi-static) radar sensing.
Figure 10:
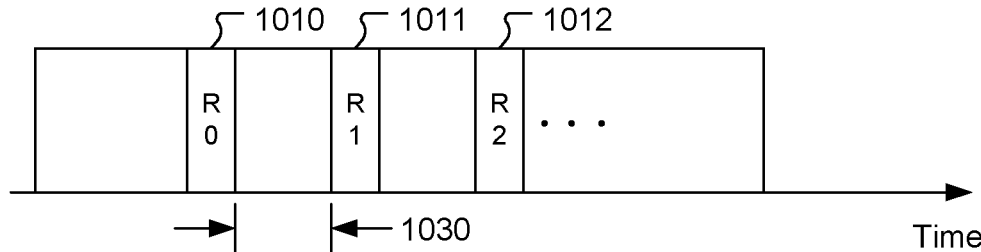
FIG. 10 is a timing diagram of signal resources used for communication and radar sensing.
Figure 11:
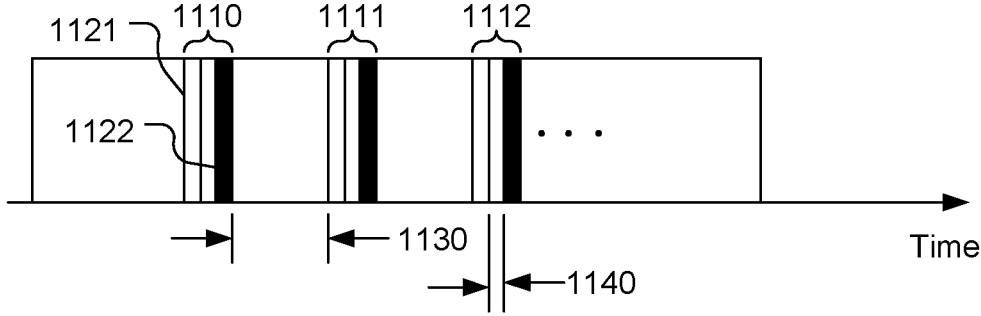
FIG. 11 is a timing diagram of portions of signal resources used for communication and portions of the signal resources used for radar sensing.

Referring also to FIGS. 9-11, a UE 910 may receive configurations from a network entity 930 for antenna switching for channel sounding and radar sensing (e.g., TDM MIMO radar sensing). The UE 910 is an example of the UE 500 and the network entity 930 is an example of the network entity 600 (e.g., a gNB). For monostatic radar sensing, the UE 910 will be both the transmitter and receiver, sending an outbound signal 911 and receiving a reflected signal 912 reflected by an object 920. For monostatic sensing, the MIMO radar at the UE 910 may be coherent or non-coherent. The UE 910 may report sensing results to the network entity 930 via a communication signal 913. For bi-static radar sensing, the UE 910 may be the transmitter and the network entity 930 may be a receiver, with the network entity 930 receiving a reflected signal 931 that is another reflection of the outbound signal 911 reflected by the object 920. For bi-static sensing, the MIMO radar at the network entity 930 is non-coherent. The UE 910 may use joint channel sounding and radar sensing signals, or may use separate channel sounding and radar sensing signals (e.g., a channel sounding signal that is TDMed and/or FDMed with respect to a radar signal). For example, as shown in FIG. 10, each of multiple transmission signals 1010, 1011, 1012 (e.g., OFDM resources) may be used for joint channel sounding and radar sensing. The UE 910 may transmit the signals 1010-1012 with different antennas, e.g., with the signals 1010, 1012 transmitted with one antenna and the signal 1011 transmitted with a different antenna. As another example, as shown in FIG. 11, respective portions of each of multiple transmission signal pairs 1110, 1111, 1112 are used to transmit signals for channel sounding and for radar sensing, e.g., with a channel sounding signal 1121 of each of the transmission signal pairs 1110-1112 used for channel sounding and a radar sensing signal 1122 of each of the transmission signal pairs 1110-1112 used for radar sensing. Alternatively, a signals for channel sounding may not be paired with a radar sensing signal. The UE 500 may transmit the signals 1121, 1122 in any of the transmission signal pairs 1110-1112 using the same antenna (with no antenna switching within a signal pair) or using different antennas (with antenna switching between the signal 1121 and the signal 1122). The UE 500 switch antennas between the transmission signal pairs 1110-1112 of sensing/communication signals, e.g., here between the transmission signal pairs 1110, 1111 and/or between the transmission signal pairs 1111, 1112. The signals 1121, 1122 are TDMed by the UE 500 within each of the transmission signal pairs 1110-1112. The signals 1121, 1122 may also or alternatively be FDMed by the UE 500. Also, FIG. 11 shows the channel sounding signal 1121 being transmitted before the radar sensing signal 1122, but the radar sensing signal 1122 may be transmitted by the UE 500 before the channel sounding signal 1121 in one or more transmission signal pairs.

One or more waveforms may be used (e.g., in the signals shown in FIGS. 10 and 11) for channel sounding and/or radar sensing, either joint sounding and sensing, or individual sounding and individual sensing. For example, an SRS waveform may be used for either or both channel sounding and radar sensing. As another example, an FMCW waveform may be used for either or both channel sounding and radar sensing as discussed below with respect to FIG. 16 and FIG. 17.

Figure 12:
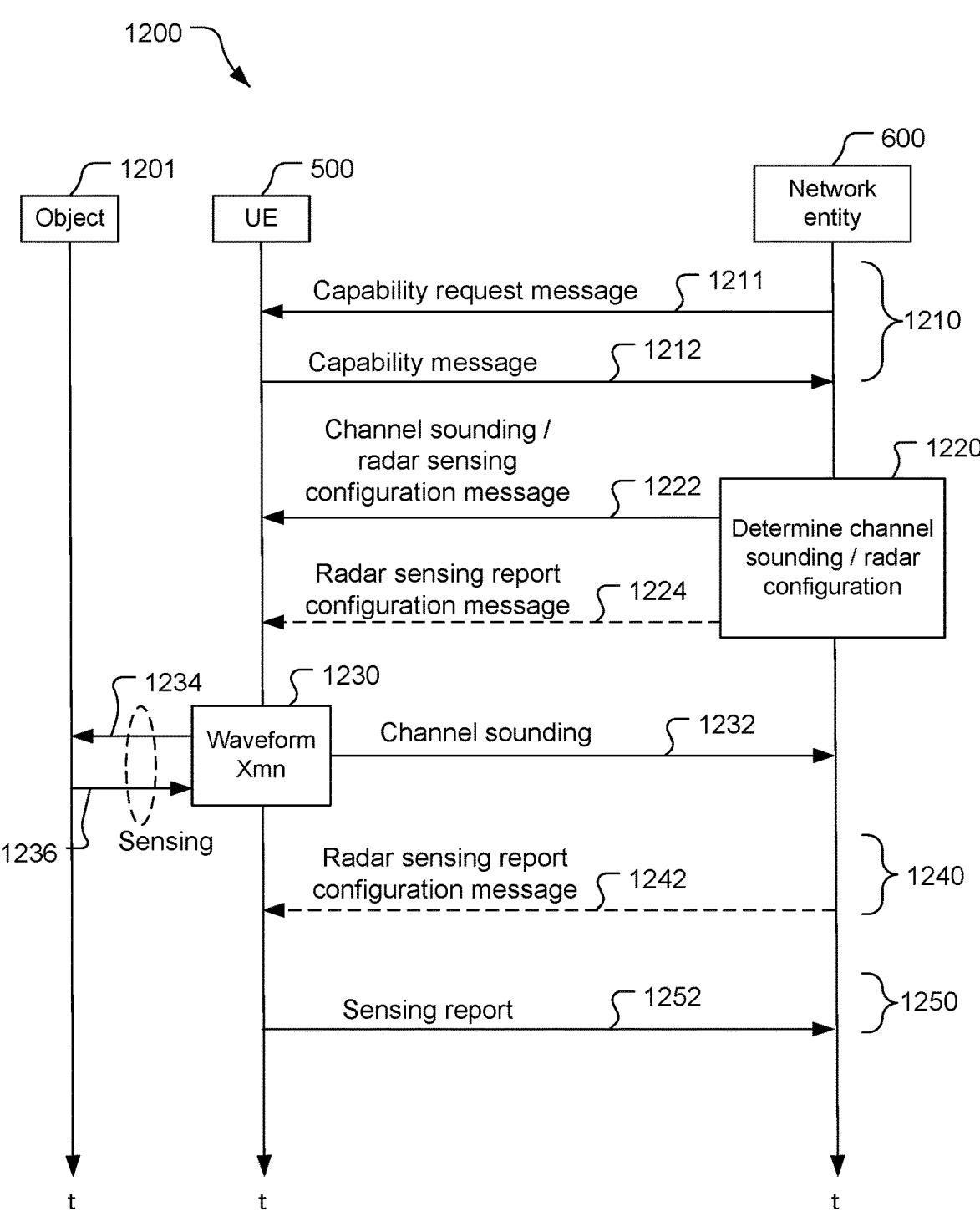
FIG. 12 is a signal and processing flow diagram for signal transmission for communication and/or monostatic radar sensing.

Referring also to FIG. 12, a signal and processing flow 1200 shows communications and radar sensing signal transfer between the UE 500, the network entity 600, and an object 1201. The signal and processing flow 1200 includes messages and stages shown, and is an example flow and not limiting. The flow 1200 may be altered, e.g., by having one or more messages and/or one or more stages added, removed, rearranged, combined, performed concurrently, and/or having one or more messages and/or one or more stages split into multiple messages and/or stages. For example, stage 1240 is optional, and one or more of messages 1224, 1242 may be omitted.

At stage 1210, the UE 500, e.g., the capability unit 550, transmits a capability message 1212 (also called a capability report) to the network entity 600. The network entity 600 may transmit a capability request message 1211 to the UE 500 requesting the UE 500 to provide capabilities of the UE 500, e.g., regarding antenna switching, channel sounding, radar sensing, and/or FMCW transmission, etc. The UE 500, e.g., the capability unit 550, may be configured to transmit the capability message 1212 in response to the request message 1211 or independently of the request message 1211 (e.g., without the request message 1211 being received or even sent). The UE 500, e.g., the capability unit 550, may be configured, for example, to provide indications of timing gaps for separations between signals used for channel sounding and radar sensing (e.g., TDM MIMO radar sensing), e.g., between signals used for joint channel sounding and radar sensing, between pairs of signals each used for channel sounding and radar sensing, or between a channel sounding signal and a radar sensing signal in a pair of signals. For example, the capability unit 550 may be configured to indicate a minimum timing gap 1030 between joint channel sounding and radar sensing transmission signals, e.g., between the transmission signals 1010, 1011, to be transmitted by different antennas of the UE 500 (e.g., between which there is antenna switching). The minimum timing gap 1030, and other minimum timing gaps discussed herein, may not be the shortest time that the UE 500 can have and still process the signals received, but may be minimum in the sense that this is the minimum time gap that the UE 500 indicates to the network entity 600, e.g., to help ensure processing (e.g., with antenna switching) of the signals on either side of the gap. The value of the minimum timing gap 1030 may be independent of, or depend on, the respective waveform type of the separated signals (e.g., the signal 1010 and the signal 1011), e.g., if the waveforms for the signals 1010, 1011 are different waveforms (e.g., FMCW and SRS), if the waveforms for the signals 1010, 1011 are both FMCW, or if the waveforms for the signals 1010, 1011 are both SRS. The capability message 1212 may indicate the timing gap 1030, may indicate whether the waveform types are the same or different, and may indicate the waveform types of separated signals. As another example, the capability unit 550 may be configured to indicate a minimum timing gap 1130 between signal pairs (for channel sounding and radar sensing) to be transmitted by different antennas of the UE 500 (e.g., between which there is antenna switching), and a minimum timing gap 1140 between different signals 1121, 1122 (one or channel sounding and the other for radar sensing) within each signal pair. The value of the minimum timing gap 1130 may be independent of, or may depend on, the respective waveform type of the separated signal pairs (e.g., the signal pair 1110 and the signal pair 1111), e.g., if the waveforms for the signal pairs 1110, 1111 are different waveforms (e.g., FMCW and SRS), if the waveforms for the signal pairs 1110, 1111 are both FMCW, or if the waveforms for the signal pairs 1110, 1111 are both SRS. The capability message 1212 may indicate the timing gap 1130, may indicate whether the waveform types are the same or different, and may indicate the waveform types of separated signal pairs. The value of the minimum timing gap 1140 may depend on the respective waveform type of the signals 1121, 1122, e.g., if the waveforms for the signals 1121, 1122 are different waveforms (e.g., FMCW and SRS), if the waveforms for the signals 1121, 1122 are both FMCW, or if the waveforms for the signals 1121, 1122 are both SRS. The value of the minimum timing gap 140 may depend on whether there is antenna switching between the signals 1121, 1122. The capability message 1212 may indicate the timing gap 1140, may indicate whether the waveform types are the same or different, may indicate the waveform types of the signals 1121, 1122, and may indicate whether there is antenna switching between transmission of the signals 1121, 1122. The timing gaps 1030, 1130 may be indicated, e.g., in number of slots and/or number of symbols, and the timing gap 1140 may be indicated, e.g., in number of symbols.

The capability message 1212 may indicate one or more capabilities of the UE 500, e.g., of the channel sounding and radar sensing unit 560, regarding antenna switching, monostatic radar sensing, and/or FMCW transmission, etc. For example, the capability message 1212 may indicate whether the UE 500 (e.g., the channel sounding and radar sensing unit 560) is configured to support TDM MIMO monostatic radar sensing using antenna switching, and may indicate a timing gap (e.g., a minimum timing gap) between radar sensing measurement by the UE 500 and transmission of a sensing report by the UE 500. The capability message 1212 may indicate that the UE 500 supports FMCW transmission and whether the UE 500 supports transmission of FMCW signals using antenna switching. The capability message 1212 may indicate that the UE 500 supports FMCW transmission and whether the UE 500 supports FMCW and SRS transmission in different antenna switching JCS signals or different signals within a channel sounding and radar sensing signal pair, e.g., FMCW in one signal of a channel sounding/radar sensing signal pair, e.g., the signal 1121 and SRS in another signal of a channel sounding/radar sensing signal pair, e.g., the signal 1122. The capability message 1212 may indicate whether the UE 500 supports FMCW and SRS TDM transmission in a same transmission resource occasion, e.g., FMCW in one symbol of a transmission resource occasion and SRS in another symbol in the same transmission resource occasion.

At stage 1220, the network entity 600 (e.g., the AD unit 650) may determine one or more signal configurations, e.g., a channel sounding signal configuration and/or a radar sensing signal configuration, or a joint channel sounding and radar sensing configuration. The network entity, e.g., the AD unit 650, may transmit, and the UE 500 may receive, a channel sounding/radar sensing configuration message 1222 with the determined signal configuration(s) for channel sounding and radar sensing. The network entity, e.g., the AD unit 650, may transmit a radar sensing report configuration message 1224 with a configuration of a report for reporting radar sensing results (e.g., measurements and/or measurement-based information such as ranges). The configuration(s) may be based on one or more capabilities indicated in the capability message 1212. For example, a gap between resources and/or a gap (if any) between signals within a channel sounding/radar sensing signal pair and/or a gap between radar sensing and a radar sensing report may be at least as great as one or more respective minimum timing gaps indicated in the capability message 1212. The configuration(s) may include appropriate waveform types, e.g., FMCW, or SRS, or TDMed FMCW and SRS. The configuration(s) may indicate one or more purposes of the corresponding signals, e.g., joint channel sounding and radar sensing (e.g., TDM MIMO monostatic radar sensing), or channel sounding and radar sensing signal pairs, or channel sounding only, or radar sensing only.

At stage 1230, the UE 500, e.g., the channel sounding and radar sensing unit 560, may transmit one or more channel sounding signals 1232 and one or more radar sensing signals 1234 in accordance with the configuration(s) received in the message 1222. The same signal(s) may be used for both the channel sounding signal(s) 1232 and the radar sensing signal(s) 1234. The network entity 600 may be configured to receive the waveform(s) transmitted by the UE 500 in the channel sounding signal(s) 1232 based on (antenna switching resources in) the channel sounding signal(s) 1232 being configured for joint channel sounding and monostatic radar sensing (e.g., TDM MIMO monostatic radar sensing), or channel sounding only. The UE 500 may receive one or more reflected signals 1236 comprising one or more reflections (echoes) of the transmitted radar sensing signal(s) 1234 (e.g., in the configured antenna switching resources).

At stage 1240, the network entity 600, e.g., the AD unit 650, may transmit a radar sensing report configuration message 1242 with a configuration of a report for reporting radar sensing results. The message 1242 may be transmitted by the network entity 600 in addition to, or instead of, the radar sensing report configuration message 1224, with the message 1224 being sent by the network entity 600 before radar sensing by the UE 500, and the message 1242 being sent by the network entity 600 after radar sensing by the UE 500.

At stage 1250, the UE 500 may transmit a sensing report 1252 to the network entity 600. The UE 500 may transmit the sensing report 1252 in accordance with the configuration provide in the message 1224 and/or the message 1242. The sensing report 1252 may include information regarding the object 1201, e.g., distance and direction from the UE 500. The network entity 600 may be configured to receive the sensing report 1252, e.g., in configured resources (indicated in the message 1224 and/or the message 1242).

Figure 13:
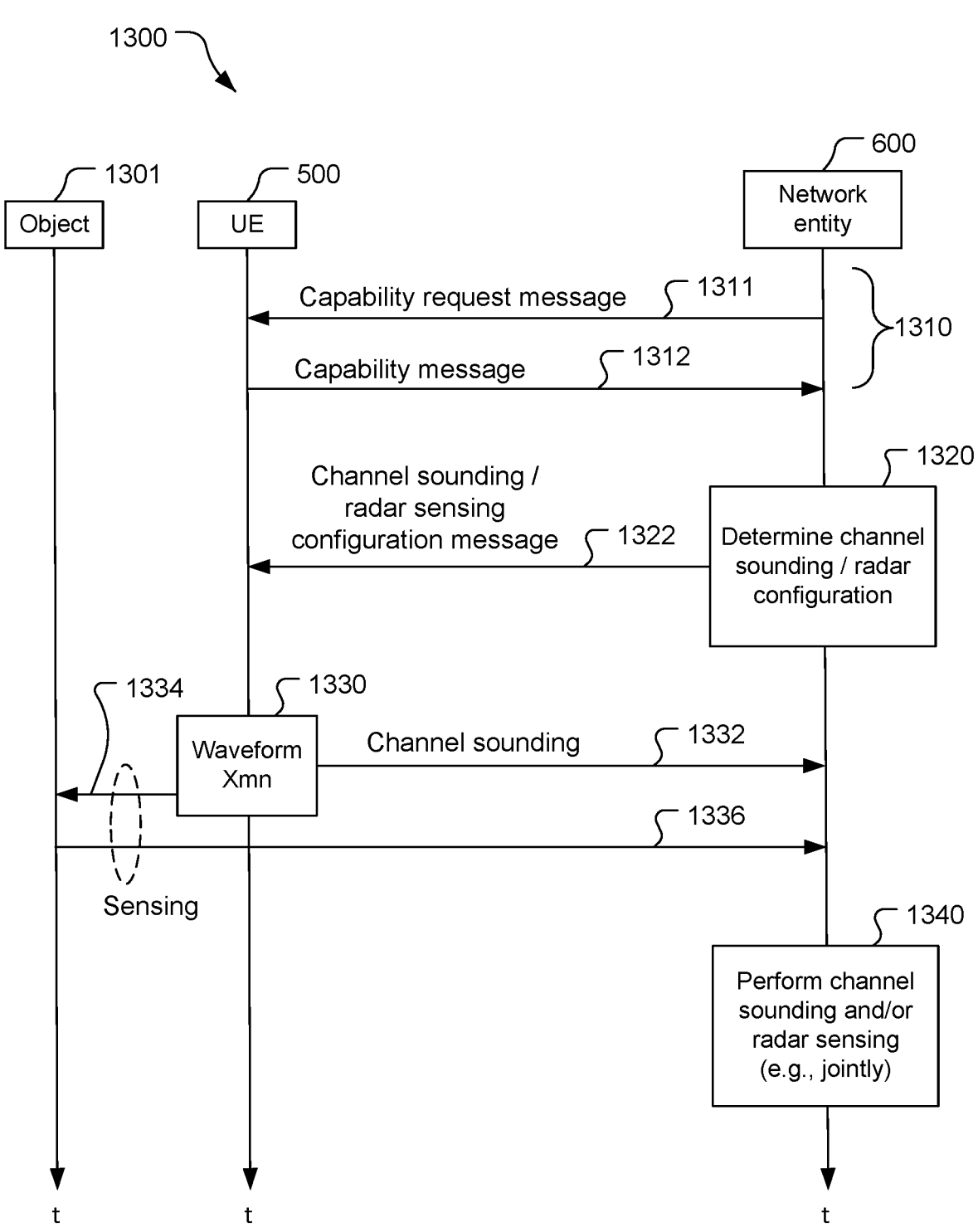
FIG. 13 is a signal and processing flow diagram for signal transmission for communication and/or bi-static radar sensing.

Referring also to FIG. 13, a signal and processing flow 1300 shows communications and radar sensing signal transfer between the UE 500, the network entity 600, and an object 1301. The signal and processing flow 1300 includes messages and stages shown, and is an example flow and not limiting. The flow 1300 may be altered, e.g., by having one or more messages and/or one or more stages added, removed, rearranged, combined, performed concurrently, and/or having one or more messages and/or one or more stages split into multiple messages and/or stages.

At stage 1310, the UE 500, e.g., the capability unit 550, transmits a capability message 1312 (also called a capability report) to the network entity 600. The network entity 600 may transmit a capability request message 1311 to the UE 500 requesting the UE 500 to provide capabilities of the UE 500, e.g., regarding antenna switching, channel sounding, radar sensing, and/or FMCW transmission, etc. The UE 500, e.g., the capability unit 550, may be configured to transmit the capability message 1312 in response to the request message 1311 or independently of the request message 1311 (e.g., without the request message 1311 being received or even sent). The UE 500, e.g., the capability unit 550, may be configured, for example, to provide indications of timing gaps for separations between joint channel sounding/radar sensing signals or separate signals used for channel sounding and radar sensing (e.g., TDM MIMO radar sensing), e.g., as discussed above with respect to FIGS. 10 and 11.

The capability message 1312 may indicate one or more capabilities of the UE 500, e.g., of the channel sounding and radar sensing unit 560, regarding antenna switching, bi-static radar sensing, and/or FMCW transmission, etc. For example, the capability message 1312 may indicate whether the UE 500 (e.g., the channel sounding and radar sensing unit 560) is configured to support TDM MIMO bi-static radar sensing using antenna switching. The capability message 1312 may indicate that the UE 500 supports FMCW transmission and whether the UE 500 supports transmission of FMCW signals using antenna switching. The capability message 1312 may indicate that the UE 500 supports FMCW transmission and whether the UE 500 supports FMCW and SRS transmission in different antenna switching signals, e.g., FMCW in an antenna switching signal 0 and SRS in antenna switching signal 1. The capability message 1312 may indicate whether the UE 500 supports FMCW and SRS TDM transmission in a single signal, e.g., a same antenna switch resource, e.g., FMCW in a first symbol of an antenna switching resource and SRS in a second symbol in the same antenna switching resource.

At stage 1320, the network entity 600 (e.g., the AD unit 650) may determine one or more signal configurations, e.g., a channel sounding signal configuration and/or a radar sensing signal configuration, or a joint channel sounding and radar sensing signal configuration. The network entity, e.g., the AD unit 650, may transmit, and the UE 500 may receive, a channel sounding/radar sensing configuration message 1322 with the determine configuration(s) for channel sounding and bi-static radar sensing. The configuration(s) may be based on one or more capabilities indicated in the capability message 1312. For example, a gap between JCS signals and/or a gap (if any) between signals within a channel sounding/radar sensing signal pair may be at least as great as one or more respective minimum timing gaps indicated in the capability message 1312. The configuration(s) may include appropriate waveform types, e.g., FMCW, or SRS, or TDMed FMCW and SRS. The configuration(s) may indicate one or more purposes of the corresponding signals, e.g., joint channel sounding and radar sensing (e.g., TDM MIMO monostatic radar sensing), or channel sounding only, or radar sensing only.

At stage 1330, the UE 500, e.g., the channel sounding and radar sensing unit 560, may transmit one or more channel sounding signals 1332 and one or more radar sensing signals 1334 in accordance with the configuration(s) received in the message 1322. The same signal(s) may be used for both the channel sounding signal(s) 1332 and the radar sensing signal(s) 1334. The network entity 600 may be configured to receive the waveform(s) transmitted by the UE 500 in the channel sounding signal(s) 1332 based on (antenna switching resources in) the channel sounding signal(s) 1332 being configured for joint channel sounding and bi-static radar sensing (e.g., TDM MIMO bi-static radar sensing), or channel sounding only. The network entity 600 may receive one or more reflected signals 1336 comprising one or more reflections (echoes) of the transmitted radar sensing signal(s) 1334 (e.g., in the configured antenna switching resources) for TDM MIMO bi-static radar sensing if the transmitted radar sensing signal(s) 1334 are configured for joint channel sounding and bi-static radar sensing, or bi-static radar sensing only.

At stage 1340, the network entity 600 may perform channel sounding and bi-static radar sensing. For example, the network entity 600 may perform joint channel sounding and radar sensing (e.g., TDM MIMO bi-static radar sensing), or channel sounding, or radar sensing. The network entity 600 may use the reflected signal(s) 1336 reflected from the object 1301 to perform the radar sensing, e.g., to determine presence and location of the object 1301.

Referring to FIG. 14, with further reference to FIGS. 1-13, a signal transfer method for communication, radar sensing, or a combination thereof 1400 includes the stages shown. The method 1400 is, however, an example only and not limiting. The method 1400 may be altered, e.g., by having one or more stages added, removed, rearranged, combined, performed concurrently, and/or having one or more single stages split into multiple stages.

At stage 1410, the method 1400 includes transmitting, from a UE, a capability message indicating a capability of the UE to perform antenna switching for radar signal transmission and for communication signal transmission. For example, the UE 500 may transmit the capability message 1212 and/or the capability message 1312 (possibly in response to the capability request message 1211 and/or the capability request message 1311). The processor 510, possibly in combination with the memory 530, in combination with the transceiver 520 (e.g., the wireless transmitter 242 (and possibly the wireless receiver 244) and the antenna 246) may comprise means for transmitting the capability message.

At stage 1420, the method 1400 includes receiving, at the UE from a network entity, a configuration message indicating a radar signal transmission configuration, or a communication signal transmission configuration, or a combination thereof. For example, the UE 500 may receive the channel sounding/radar sensing configuration message 1222 and/or the channel sounding/radar sensing configuration message 1322 from the network entity 600. The processor 510, possibly in combination with the memory 530, in combination with the transceiver 520 (e.g., the wireless receiver 244 and the antenna 246) may comprise means for receiving the configuration message.

At stage 1430, the method 1400 includes transmitting, from the UE, one or more outbound signals, the one or more outbound signals comprising a radar signal in accordance with the radar signal transmission configuration, or comprising a communication signal in accordance with the communication signal transmission configuration, or a combination thereof. For example, the UE 500 may transmit the channel sounding signal(s) 1232, the radar sensing signal(s) 1234, the channel sounding signal(s) 1332, and/or the radar sensing signal(s) 1334. The processor 510, possibly in combination with the memory 530, in combination with the transceiver 520 (e.g., the wireless transmitter 242 and the antenna 246) may comprise means for transmitting the one or more outbound signals.

Implementations of the method 1400 may include one or more of the following features. In an example implementation, the capability message indicates one or more signal types comprising a radar signal type, a communication signal type, or a combination thereof. For example, the capability message may indicate an FMCW signal type and/or an SRS signal type. In another example implementation, the capability message indicates whether the UE is capable of switching between antennas for the radar signal and the communication signal. In another example implementation, the capability message indicates a minimum gap between consecutive ones of the one or more outbound signals that are joint channel sounding and radar sensing signals. For example, the capability message 1212 and/or the capability message 1312 may indicate the gap 1030 between the signals 1010, 1011. In a further example implementation, the capability message indicates waveform types of the consecutive ones of the one or more outbound signals. For example, the capability message 1212 may indicate that the gap 1030 corresponds to an FMCW signal in one resource abutting the gap and an SRS signal in another resource abutting the gap.

Also or alternatively, implementations of the method 1400 may include one or more of the following features. In an example implementation, the one or more outbound signals comprise a plurality of signal pairs each comprising a respective radar sensing signal and a respective channel sounding signal, and wherein the capability message indicates a minimum gap between the respective radar sensing signal and the respective channel sounding signal. For example, the capability message 1212 and/or the capability message 1312 may indicate the minimum timing gap 1140 between the signals 1121, 1122. In a further example implementation, the capability message indicates that the minimum gap corresponds to waveform types of the respective radar sensing signal and the respective channel sounding signal, or antenna switching between the respective radar sensing signal and the respective channel sounding signal, or a combination thereof. For example, the minimum timing gap 1140 may depend on waveforms of the signals 1121, 1122 and/or whether there may be antenna switching between transmission of the signals (transmission of the signals 1121, 1122 with different antennas) and the capability message 1212, and/or the capability message 1312 may indicate the waveform and/or antenna switching condition corresponding to the indicated gap.

Also or alternatively, implementations of the method 1400 may include one or more of the following features. In an example implementation, the one or more outbound signals comprise a plurality of signal pairs each comprising a respective radar sensing signal and a respective channel sounding signal, and wherein the capability message indicates a minimum gap between consecutive ones of the plurality of signal pairs. For example, the capability message 1212 and/or the capability message 1312 may indicate the minimum timing gap 1130 between consecutive pairs 1110, 1111 of the signals 1121, 1122. In a further example implementation, the capability message indicates that the minimum gap corresponds to waveform types of the consecutive ones of the plurality of signal pairs, or antenna switching between the consecutive ones of the plurality of signal pairs, or a combination thereof. For example, the minimum timing gap 1130 may depend on waveforms of the pairs 1110, 1111 of the signals 1121, 1122 and/or whether there may be antenna switching between transmission of the pairs 1110, 1111 (transmission of the pairs 1110, 1111 of the signals 1121, 1122 with different antennas) and the capability message 1212, and/or the capability message 1312 may indicate the waveform and/or antenna switching condition corresponding to the indicated gap.

Also or alternatively, implementations of the method 1400 may include one or more of the following features. In an example implementation, the capability message indicates whether the UE supports radar sensing using antenna switching, and a timing gap between a sensing measurement and a sensing report. For example, the capability message 1212 may indicate that the UE supports antenna switching for radar sensing and indicate a minimum time gap between sensing of the reflected signal(s) 1236 and transmission of the sensing report 1252. In another example implementation, the capability message indicates whether the UE supports antenna switching for Frequency Modulated Continuous Wave transmissions. In another example implementation, the capability message indicates whether the UE supports transmission of different waveform types in different symbols of a single occasion of a transmission resource. For example, the capability message 1212 and/or the capability message 1312 may indicate whether the UE supports FMCW in one symbol of a transmission resource occasion and SRS in another symbol in the same transmission resource occasion. In another example implementation, the capability message indicates whether the UE is capable of transmitting a same signal type for both the radar signal and the communication signal.

Referring to FIG. 15, with further reference to FIGS. 1-12, a method 1500 for transmitting signal configuration information for communication, radar sensing, or a combination thereof includes the stages shown. The method 1500 is, however, an example only and not limiting. The method 1500 may be altered, e.g., by having one or more stages added, removed, rearranged, combined, performed concurrently, and/or having one or more single stages split into multiple stages.

At stage 1510, the method 1500 includes receiving, at a network entity from a UE, a capability message indicating a capability of the UE to perform antenna switching for radar signal transmission and for communication signal transmission. For example, the network entity 600 may receive the capability message 1212 and/or the capability message 1312. The processor 610, possibly in combination with the memory 630, in combination with the transceiver 620 (e.g., the wireless receiver 344 and the antenna 346, the wired receiver 354, the wireless receiver 444 and the antenna 446, or the wired receiver 454) may comprise means for receiving the capability message.

At stage 1520, the method 1500 includes transmitting, from the network entity to the UE, a configuration message indicating a radar signal transmission configuration, or a communication signal transmission configuration, or a combination thereof, the configuration message indicating antenna switching for different signal transmission configurations of the configuration message. For example, the network entity 600 (e.g., the AD unit 650) may transmit the channel sounding/radar sensing configuration message 1222 and/or the channel sounding/radar sensing configuration message 1322 to the UE 500. The processor 610, possibly in combination with the memory 630, in combination with the transceiver 620 (e.g., the wireless transmitter 342 and the antenna 346, the wired transmitter 352, the wireless transmitter 442 and the antenna 446, or the wired transmitter 452) may comprise means for transmitting the configuration message.

Implementations of the method 1500 may include one or more of the following features. In an example implementation, the configuration message indicates one or more signal types comprising a radar signal type, a communication signal type, or a combination thereof, based on the capability message indicating the one or more signal types. In another example implementation, the method 1500 includes performing, at the network entity, joint communication and bi-static radar sensing based on signal transmission from the UE. For example, the network entity 600 may perform joint communication and bi-static radar sensing at stage 1340 using the channel sounding signal(s) 1332 and the reflected signal(s) 1336. The processor 610, possibly in combination with the memory 630, may comprise means for performing joint communication and bi-static radar sensing. In another example implementation, the configuration message indicates one or more timing configuration gaps that are each at least as long as one or more corresponding capability timing gaps indicated in the capability message for different signal transmissions by the UE. For example, the channel sounding/radar sensing configuration message 1222 and/or the channel sounding/radar sensing configuration message 1322 may indicate one or more timing gaps (e.g., the gaps 1030, 1130, 1140, or a gap between sensing and reporting) that is(are) at least as long as corresponding supported gaps indicated in the capability message(s) 1212, 1312. In another example implementation, the configuration message indicates different waveform types for the different signal transmission configurations. For example, the channel sounding/radar sensing configuration message 1222 and/or the channel sounding/radar sensing configuration message 1322 may indicate different waveform types (e.g., FMCW, SRS, etc.) for different signal transmission configurations (e.g., corresponding to different antennas transmitting in the same resource (e.g., different symbols) or different resources). In another example implementation, the configuration message indicates a same signal type for both the radar signal transmission configuration and the communication signal transmission configuration. For example, the channel sounding/radar sensing configuration message 1222 and/or the channel sounding/radar sensing configuration message 1322 may indicate the same waveform type (e.g., FMCW or SRS) for both radar and communication.

FMCW for Channel Sounding

Figure 16:
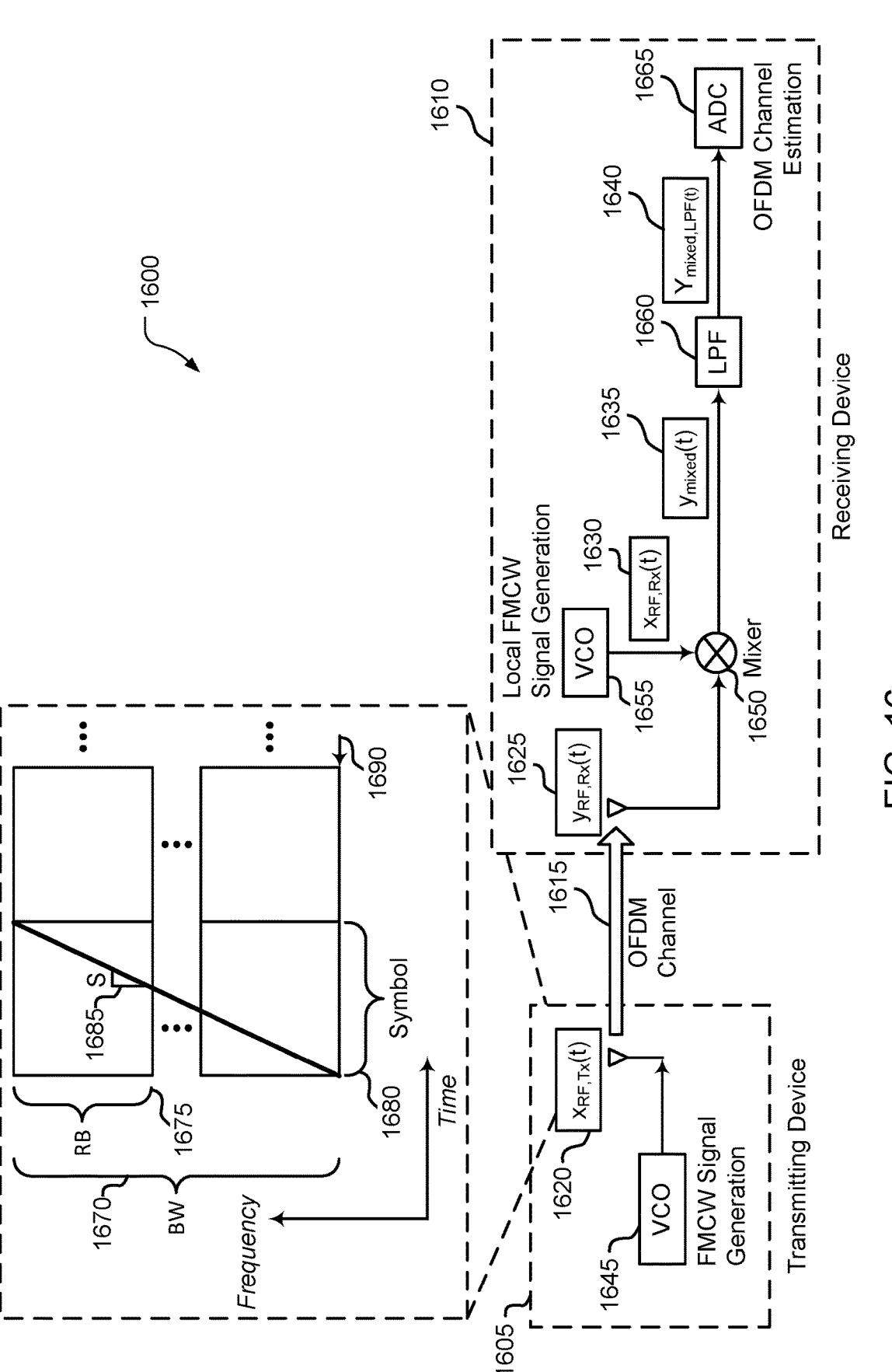
FIG. 16 is a block diagram of an example of an OFDM channel estimation scheme that supports estimating OFDM channels using FMCWs.

FIG. 16 illustrates an example of an OFDM channel estimation scheme 1600 that supports estimating OFDM channels using FMCWs in accordance with one or more aspects of the present disclosure. In some examples, the OFDM channel estimation scheme 1600 may implement aspects of the wireless communications system 100 described with reference to FIG. 1. In this example, a transmitting device 1605 (e.g., a UE, a base station, an RU, a DU, a CU, an IAB (Integrated Access Backhaul) node or some other device) and a receiving device 1610 (e.g., a UE, a base station, an RU, a DU, a CU, an IAB node or some other device) may exchange an FMCW signal via an OFDM channel 1615. The FMCW signal may be used to facilitate channel estimation of the frequency domain OFDM channel by the receiving device 1610.

The transmitting device 1605 and the receiving device 1610 may establish a connection for wireless communications via an OFDM channel 1615. The devices may be UEs, network entities, other devices, or any combination thereof. In some examples, the devices may exchange one or more capability messages, control messages, or both to initiate an FMCW-based OFDM channel estimation procedure described herein.

After the FMCW-based OFDM channel estimation procedure is initiated, the transmitting device 1605 may produce an FMCW signal 1620 (e.g., a first FMCW signal). The transmitting device 1605 may produce the FMCW signal 1620 in an analog domain using a voltage controlled oscillator (VCO) 1645. The transmitting device 1605 may transmit the FMCW signal 1620 via the OFDM channel 1615 using at least one antenna element at the transmitting device 1605. The analog domain FMCW signal 1620 produced and transmitted by the transmitting device 1605 may be represented by $x_{RF,Tx}(t)$, shown in Equation (1).

$$x_{RF,Tx}(t) = \cos\left(2\pi\left(f_c + \frac{S}{2}t\right)t + \phi_{Tx}\right) \tag{1}$$

As shown in Equation (1), the FMCW signal 1620 may be a time-domain signal (e.g., a function of time (t)). In the example of Equation (1), $f_c$ may represent a starting frequency 1690 of the FMCW signal 1620, S may represent a slope 1685 of the FMCW signal 1620, and $\phi_{Tx}$ may represent a phase of the transmitting device 1605.

As illustrated in FIG. 16, the FMCW signal 1620 may be associated with a waveform signal transmitted via a symbol 1680 of the OFDM channel 1615 in the time domain and a bandwidth 1670 (e.g., BW) of the OFDM channel 1615 in the frequency domain. The bandwidth 1670 may include one or more resource blocks 1675 in the frequency domain. In some examples, each resource block 1675 may include a set of resource elements in the frequency domain. The OFDM channel 1615 may include multiple symbols 1680 in the time domain. A duration or length of each symbol 1680 may correspond to a length of an OFDM symbol, or a length of an OFDM symbol and a respective cyclic prefix duration, or a partial length of an OFDM symbol, or a partial length of an OFDM symbol and a respective cyclic prefix duration, or some other length longer than the length of the OFDM symbol and the length of the OFDM symbol and cyclic prefix duration, or some other symbol duration, or any combination thereof. The FMCW signal 1620 may span frequencies between the starting frequency 1690 and a sum of the starting frequency 1690 and the bandwidth 1670 (e.g., {$f_c$, $f_c$+BW}). The slope 1685 of the FMCW signal 1620 may correspond to a quotient of the bandwidth 1670 and a duration of the symbol 1680 via which the FMCW signal 1620 is transmitted, as shown by Equation (2).

$$S = \frac{BW}{T_{sym}} = \frac{N_{RE} \cdot \Delta f}{T_{sym}} = N_{RE} \cdot \Delta f \cdot \Delta f \tag{2}$$

In the example of Equation (2), $T_{sym}$ may represent the duration of the symbol 1680. $N_{RE}$ may represent a quantity of resource elements in the bandwidth 1670, and $\Delta f$ may represent an SCS. In this example, the slope may be calculated based on a symbol duration that corresponds to a length of an OFDM symbol. For example, the duration of the symbol 1680 may be an inverse of an SCS (e.g., $$T_{sym} = \frac{1}{\Delta f}\right).$$

The radio frequency FMCW signal 1625 that is received by the receiving device 1610 via the OFDM channel 1615 in response to the FMCW signal 1620 transmitted by the transmitting device 1605 may be represented by $y_{RF,Rx}(t)$, shown in Equation (3).

$$y_{RF,Rx}(t) = \sum_{p=0}^{P-1} A_p x_{RF,Tx}(t - \tau_p) + n(t) = \tag{3}$$
$$\sum_{p=0}^{P-1} A_p \cos\left(2\pi\left(f_c + \frac{S}{2}(t - \tau_p)\right)(t - \tau_p) + \phi_{Tx}\right) + n(t)$$

In the example of Equation (3), P may represent a quantity of channel delay paths (e.g., a quantity of multi-paths) associated with the OFDM channel 1615, and $\tau_p$ may represent a given channel delay with index p. That is, the received FMCW signal 1625 may be sampled over various channel delays (e.g., p=0 to P−1). $A_p$ may represent conditions of the OFDM channel 1615 and n(t) may represent channel noise. The channel noise may be associated with a relatively small value relative to the other values that define the radio frequency FMCW signal 1625 that is received by the receiving device 1610 in Equation (3).

The receiving device 1610 may produce an FMCW signal 1630 at the receiving device. The FMCW signal 1630 produced at the receiving device 1610 may be referred to as a second FMCW signal or a local FMCW signal. The receiving device 1610 may produce the FMCW signal 1630 in the analog domain using a VCO 1655 at the receiving device 1610. The receiving device 1610 may produce the FMCW signal 1630 at the same time as or after receiving the FMCW signal 1625. The FMCW signal 1630 produced by the receiving device 1610 may be represented by $x_{RF,Rx}(t)$, shown in Equation (4).

$$x_{RF,Rx}(t) = \exp\left(-j\left(2\pi\left(f_c + \frac{S}{2}t\right)t - \phi_{Rx}\right)\right) \tag{4}$$

As shown in Equation (4), the receiving device 1610 may produce the FMCW signal 1630 based on a set of FMCW parameters associated with the FMCW signal 1620 transmitted by the transmitting device 1605. The set of FMCW parameters may include, for example, the starting frequency 1690 ($f_c$) of the FMCW signal 1620, the slope 1685(S) of the FMCW signal 1620, an initial phase of a transmitting device (e.g., $\phi_{Tx}$), or any combination thereof. That is, the FMCW signal 1630 produced by the receiving device 1610 may have a same starting frequency 1690 and slope 1685 as the FMCW signal 1620 produced by the transmitting device 1605. In the example of Equation (4), $\phi_{Rx}$ may represent a phase of the receiving device 1610. The phase of the receiving device may be the same as the phase of the transmitting device (e.g., $\phi_{Tx}=\phi_{Rx}$). The transmitting device 1605 may transmit a control message that indicates the set of FMCW parameters for generation, by the receiving device 1610, of the FMCW signal 1630. Additionally or alternatively, the receiving device 1610 may transmit a control message that indicates the set of FMCW parameters for generation, by the transmitting device 1605, of the FMCW signal 1620 and for generation, by the receiving device 1610, of the FMCW signal 1630.

The FMCW signal 1620 transmitted by the transmitting device 1605 and the FMCW signal 1630 produced at the receiving device 1610 may have similar FMCW structures. For example, both signals may be wideband signals (e.g., may span a full bandwidth 1670 of the OFDM channel 1615), may span a duration of a symbol 1680 in the OFDM channel 1615, may be associated with the starting frequency 1690, and may be associated with the slope 1685. In some examples, the FMCW signal 1620 transmitted by the transmitting device 1605 may be a real signal. For example, the FMCW signal 1620 may include a single stream (e.g., a cosine stream, as shown in Equation (1)). The FMCW signal 1630 produced by the receiving device 1610 may include two streams (e.g., a sinusoidal stream and a cosine stream) for channel estimation. That is, the exponential function in the FMCW signal 1630 produced by the receiving device 1610 may be designed for channel estimation. The receiving device 1610 may be configured with a function for generating the FMCW signal 1630 for channel estimation, or the receiving device 1610 may receive a control message that indicates the function for generating the FMCW signal 1630 for channel estimation.

After generating the FMCW signal 1630 configured for channel estimation, the receiving device 1610 may produce a combined FMCW signal 1635 (e.g., $y_{mixed}(t)$). To produce the combined FMCW signal 1635, the receiving device 1610 may combine the FMCW signal 1625 received at the receiving device 1610 with the locally produced FMCW signal 1630 using a mixer 1650. The mixer 1650 may represent an example of one or more components (e.g., hardware, software, or both) of the receiving device 1610 that are configured to combine two or more time-domain FMCW signals. In some examples, the combining may include multiplying the FMCW signals (e.g., $y_{mixed}(t)=y_{RF,Rx}(t)x_{RF,Rx}(t)$).

The receiving device 1610 may filter the combined FMCW signal 1635 using an LPF 1660 at the receiving device 1610. The LPF 1660 may produce a combined and filtered FMCW signal 1640 (e.g., $y_{mixed,LPF}(t)$). The LPF 1660 may represent an example of a component of the receiving device 1610 that is configured to filter signals, or a function supported by the receiving device 1610, or both. For example, the receiving device 1610 may apply an LPF function to the combined FMCW signal 1635 (e.g., $y_{mixed}$, LPF(t)=LPF $[y_{RF,Rx}(t)x_{RF,UE}(t)]$). The combined and filtered FMCW signal 1640 may be represented by Equation (5).

$$y_{mixed,LPF}(t) = \tag{5}$$
$$\sum_{p=0}^{P-1} \frac{A_p}{2} \exp\left(-j\left(2\pi\left(f_c - \frac{S}{2}\tau_p\right)\tau_p + \phi_{Rx} - \phi_{Tx}\right)\right) \exp(-j2\pi S\tau_p \cdot t) + \tilde{n}(t)$$

Equation (5) may be simplified according to Equation (6).

$$y_{mixed,LPF}(t) = \sum_{p=0}^{P-1}\beta_p \exp(-j2\pi S\tau_p \cdot t) + \tilde{n}(t), \text{ where} \tag{6}$$

$$\beta_p = \frac{A_p}{2}\exp\left(-j(2\pi f_c\tau_p)\right)\exp\left(j\left(2\pi\left(\frac{S}{2}\tau_p\right)\tau_p - \phi_{Rx} + \phi_{Tx}\right)\right)$$

The second exponential function in $\beta_p$ may represent a channel estimation error that may be ignored to further simplify Equation (6). For example, one half of the second exponential function of $$\beta_p\left(\text{e.g., } \frac{1}{2}\exp\left(j\left(2\pi\left(\frac{S}{2}\tau_p\right)\tau_p - \phi_{Rx} + \phi_{Tx}\right)\right)\right)$$

may be associated with channel estimation error. However, if a value of $\tau_p$ is relatively small, the channel estimation error may also be relatively small (e.g., negligible). The channel noise included in the radio frequency FMCW signal 1625 (e.g., $y_{RF,Rx}(t)$) that is received by the receiving device 1610 may be represented by $\tilde{n}(t)$ after the signal is combined with the produced FMCW signal 1630 and filtered using the LPF 1660. As described with reference to Equation (3), the channel noise $\tilde{n}(t)$ may be associated with a relatively small value relative to the other values that define the combined and filtered FMCW signal 1640 shown in Equations 5 and 6.

After combining and filtering the FMCW signals, the receiving device 1610 may perform frequency domain OFDM channel estimation using time-domain signal processing based on sampling the combined and filtered FMCW signal 1640. The receiving device 1610 may use an ADC 1665 to sample the combined and filtered FMCW signal 1640 in the time domain. A sampling rate used to sample the combined and filtered FMCW signal 1640 may be based on one or more parameters associated with the OFDM channel 1615. For example, the sampling rate may be based on a frequency range of one or more subbands in the OFDM channel 1615 (e.g., the sampling rate, $$\frac{1}{T_s},$$

may be equal to an inverse of $$T_s = \frac{1}{F_s} = \frac{f_{subband}}{S}\bigg).$$

The subband frequency range, $f_{subband}$, may represent a granularity at which the receiving device 1610 can estimate the OFDM channel 1615 in the frequency domain.

The sampling by the receiving device 1610 as part of the OFDM channel estimation may produce a sampling sequence, $D_{Rx}(k)$, which may represent a set of values associated with the OFDM channel estimation. The sampling sequence may have a granularity of $f_{subband}$. For example, each value of $D_{Rx}(k)$ may represent an example of an estimated value of a respective frequency subband of the OFDM channel 1615. The sampling sequence, $D_{Rx}(k)$, is shown by Equation (7).

$$D_{Rx}(k) = \sum_{p=0}^{P-1}\beta_p \exp\left(-j2\pi\tau_p \cdot k \cdot \frac{S}{F_s}\right) + \tilde{n}(t) = \tag{7}$$

$$\sum_{p=0}^{P-1}\beta_p \exp(-j2\pi\tau_p \cdot k \cdot f_{subband}) + \tilde{n}(t), k = 0, 1, \ldots, K-1$$

In the example of Equation (7), $F_s$ may represent the sampling rate used by the receiving device 1610 to estimate the OFDM channel 1615. The term k may represent a total quantity of subbands in the OFDM channel 1615, which may also correspond to a total quantity of samples in the sampling sequence. Accordingly, each value of k may represent an index of a respective subband of the total quantity of subbands. For example, if the subband frequency range $f_{subband}$ of the OFDM channel 1615 is equal to one resource element, then the sampling sequence may include a respective sample or estimated value of each resource element in the OFDM channel 1615 (e.g., per comb). The subband frequency range $f_{subband}$ may be any other granularity, such as a set of two or more resource elements, a resource block, or some other frequency range.

The receiving device 1610 may estimate the frequency domain OFDM channel 1615 using time domain signal processing and with a granularity of $f_{subband}$ based on the FMCW signal 1625 received at the receiving device 1610 and the FMCW signal 1630 produced by the receiving device 1610. The described FMCW-based OFDM channel estimation techniques may be performed by the receiving device 1610 in the time domain using time domain signal processing. That is, the receiving device 1610 may refrain from applying FFT or other frequency transforms when using the FMCW signals to estimate the frequency domain OFDM channel 1615. By performing the OFDM channel estimation in the time domain, the receiving device 1610 may reduce processing complexity, latency, and power consumption as compared with other OFDM channel estimation techniques performed at least partially in the frequency domain (e.g., using FFT). Additionally or alternatively, the receiving device 1610 may estimate the frequency domain OFDM channel 1615 using both wideband radio frequency processing and narrowband radio frequency processing. For example, the FMCW signal 1625 received at the receiving device 1610 may be a wideband signal in the radio frequency, and after the LPF 1660, the combined and filtered FMCW signal 1640 may be a narrowband signal for baseband processing.

The sampling rate used by the receiving device 1610 to estimate the frequency domain OFDM channel 1615 using FMCW signals may be relatively low. The sampling rate described herein may be based on the slope 1685 of the FMCW signals and the frequency granularity $f_{subband}$. For example, the sampling rate may be equal to $$\frac{S}{f_{subband}} = \frac{N_{RE} \cdot \Delta f \cdot \Delta f}{k_{subband} \cdot \Delta f} = \frac{N_{RE} \cdot \Delta f}{k_{subband}},$$

where $k_{subband}$ represents a quantity of resource elements in each frequency subband (e.g., each sampled portion of the frequency domain OFDM channel 1615). A sampling rate of some OFDM-based OFDM channel estimation techniques (e.g., as described with reference to FIG. 2) may be equal to a product of an FFT size, $N_{FFT}$, and an SCS, f (e.g., $N_{FFT} \cdot \Delta f$). Thus, a ratio of the sampling rate of the FMCW-based OFDM channel estimation described herein relative to the OFDM-based OFDM channel estimation techniques may be represented by y, as shown in Equation (8).

$$\gamma = \frac{N_{RE} \cdot \Delta f}{k_{subband} \cdot \Delta f \cdot N_{fft}} = \frac{N_{RE}}{k_{subband} \cdot N_{fft}} \quad (8)$$

As shown by Equation (8), the ratio between the sampling rate of the FMCW-based OFDM channel estimation techniques and the OFDM-based OFDM channel estimation techniques may be relatively low. For example, the sampling rate of the FMCW-based OFDM channel estimation techniques may be relatively low compared to the OFDM-based OFDM channel estimation techniques. For example, if there are 273*12 resource elements in the bandwidth 1670 (e.g., $N_{RE}$=273*12), and each subband includes a single resource element (e.g., $k_{subband}$=1), the ratio, may be equal to 0.8. In such cases, the FMCW-based OFDM channel estimation techniques may produce an ADC sampling gain of approximately 20 percent. In some examples, such as for scenarios in which the receiving device (e.g., a UE 115) reports channel state information (CSI) or precoding matrix indicator (PMI), the subband size may be, at a minimum, equal to $$\frac{N_{RE}}{37}$$

because a maximum quantity of subbands (e.g., N3) that may be reported via the CSI or PMI report may be 37.

Figure 17:
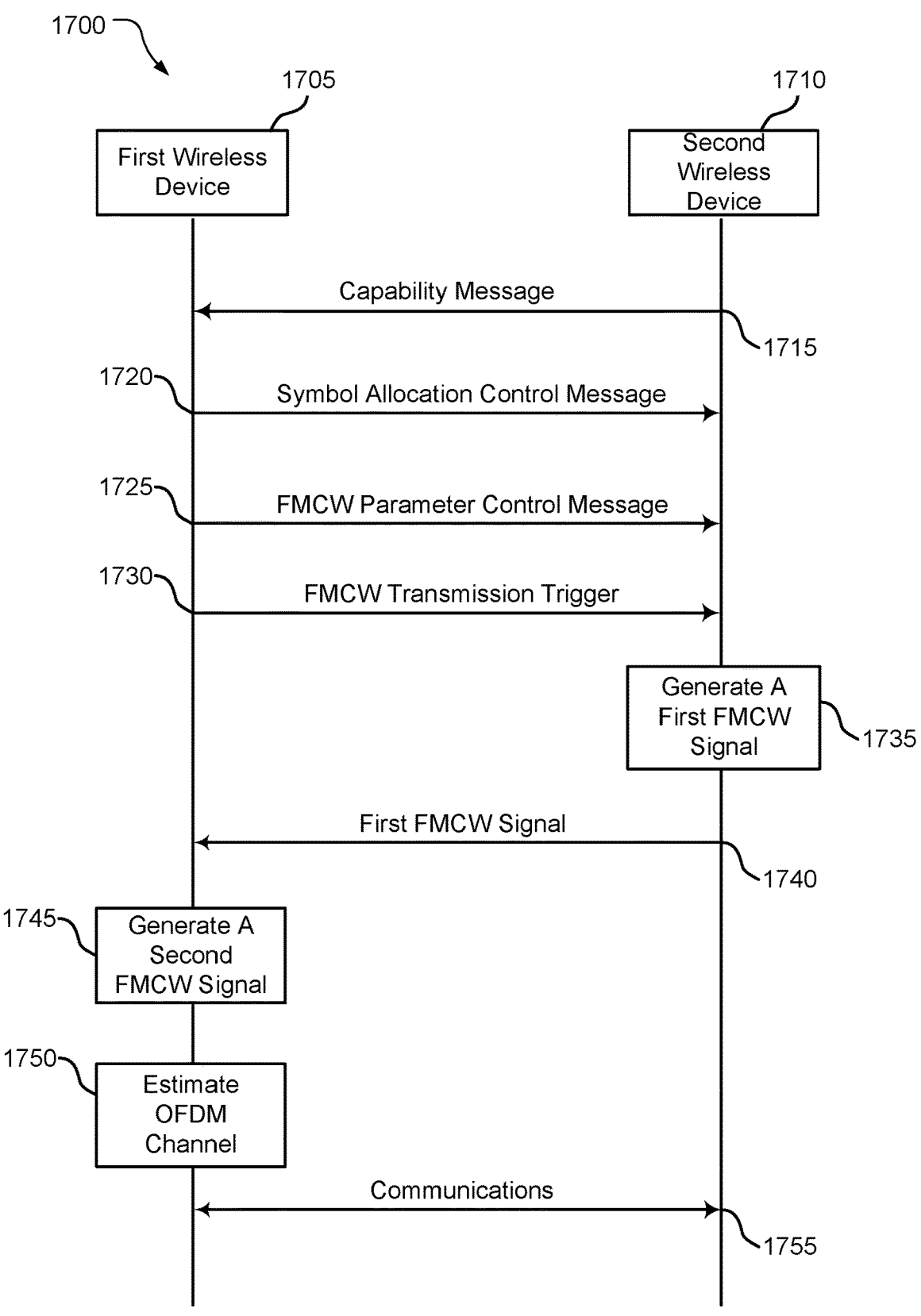
FIG. 17 is a signal and processing flow diagram for estimating OFDM channels using FMCWs.

FIG. 17 illustrates an example of a signaling and process flow 1700 that supports estimating OFDM channels using FMCWs. The signaling and process flow 1700 may implement or be implemented by aspects of the wireless communications system 100 or the OFDM channel estimation scheme 1600. For example, the signaling and process flow 1700 illustrates communications between a first wireless device 1705 and a second wireless device 1710. In this example, the first wireless device 1705 may represent an example of the network entity 600 and the second wireless device 1710 may represent an example of the UE 500. The devices may exchange signaling to support FMCW-based OFDM channel estimation.

In the following description of the signaling and process flow 1700, the operations between the first wireless device 1705 and the second wireless device 1710 may be performed in different orders or at different times. Some operations may also be left out of the signaling and process flow 1700, or other operations may be added. Although the first wireless device 1705 and the second wireless device 1710 are shown performing the operations of the signaling and process flow 1700, some aspects of some operations may also be performed by one or more other wireless devices.

At stage 1715, the second wireless device 1710 may transmit a capability message to the first wireless device 1705. The capability message may indicate whether the second wireless device 1710 is capable of transmitting FMCW signals (e.g., an FMCW transmission capability). The capability message may indicate whether the second wireless device 1710 is capable of transmitting FMCW signals configured for frequency domain OFDM channel estimation.

At stage 1720, the first wireless device 1705 may transmit a first control message, which may be referred to as a symbol allocation control message. The first control message may indicate whether one or more symbols of the OFDM channel are allocated for FMCW signals or OFDM signals. For example, the first control message may include a bitmap or one or more indices configured to allocate a first set of symbols for transmission and reception of OFDM signals and a second set of symbols for transmission and reception of FMCW signals. The OFDM signals and the FMCW signals may be time division multiplexed across the symbols of the OFDM channel. The first wireless device 1705 may transmit the first control message dynamically or semi-persistently to the second wireless device 1710 to indicate symbol allocations to the second wireless device 1710. The first control message may be, for example, a DCI message, a MAC-CE, an RRC message, or any combination thereof. In some examples, the first wireless device 1705 may transmit the symbol allocation control message based on (e.g., in response to) the capability message from the second wireless device 1710.

At stage 1725, the first wireless device 1705 may transmit a second control message, which may be referred to as an FMCW parameter control message in some aspects herein. The second control message may indicate a set of FMCW parameters associated with a first FMCW signal to be transmitted by the second wireless device 1710. The set of FMCW parameters may include a starting frequency of the first FMCW signal, a bandwidth of the first FMCW signal, a slope of the first FMCW signal, or any combination thereof (e.g., $\{f_c\}$, $\{BW\}$, $\{S\}$). The starting frequency, bandwidth, and slope may represent examples of corresponding parameters described with reference to FIG. 16. The slope may be based on the bandwidth of the first FMCW signal and a duration of a symbol via which the first FMCW signal is to be transmitted.

The second control message may be a DCI message, a MAC-CE, an RRC message, some other type of control signaling, or any combination thereof. The first wireless device 1705 may transmit the second control message (e.g., an indication of the FMCW parameters) dynamically or semi-persistently. The first wireless device 1705 may transmit one or more RRC messages that may each configure (e.g., pre-configure) a set of FMCW parameters, and the second control message may be a DCI message or MAC-CE signaling that indicates, to the second wireless device 1710, an index to one of the sets of FMCW signals. Additionally or alternatively, the first wireless device 1705 may transmit a single RRC message that configures multiple sets of FMCW parameters, and the second control message may be a DCI message or MAC-CE signaling that indicates, to the second wireless device 1710, an index to one of the sets of FMCW signals.

At stage 1730, the first wireless device 1705 may transmit a third control message to the second wireless device 1710. The third control message may be referred to as an FMCW transmission trigger in some aspects herein. The FMCW transmission trigger may trigger the second wireless device 1710 to transmit an FMCW signal. The FMCW transmission trigger may include a request, instructions, or an indication to trigger the second wireless device 1710 to produce and transmit an FMCW signal for estimating a frequency domain OFDM channel.

Although the symbol allocation control message, the FMCW parameter control message, and the FMCW transmission trigger (e.g., the first through third control messages) are illustrated as separate control messages, the first wireless device 1705 may transmit any quantity of control messages to indicate any combination of the described symbol allocations, FMCW parameters, and FMCW transmission trigger. The first wireless device 1705 may transmit a single control message (e.g., a single DCI, MAC-CE or RRC message) that indicates each of the symbol allocation for FMCW, the set of FMCW parameters, and the FMCW transmission trigger. Additionally or alternatively, the first wireless device 1705 may transmit two control messages, to indicate the symbol allocation for FMCW and the set of FMCW parameters, respectively. Reception, by the second wireless device 1710, of the symbol allocation for FMCW, the set of FMCW parameters, or both, may trigger the second wireless device 1710 to transmit an FMCW signal for channel estimation (e.g., via the allocated symbols and using the indicated FMCW parameters). Any one or more of the first through third control messages may be transmitted by the first wireless device 1705 based on (e.g., in response to, after) the capability message from the second wireless device 1710 indicating that the second wireless device 1710 supports FMCW transmission.

At stage 1735, the second wireless device 1710 may produce a first FMCW signal for estimation, by the first wireless device 1705, of the OFDM channel. The first FMCW signal may be produced or configured to support frequency domain OFDM channel estimation. The second wireless device 1710 may produce the first FMCW signal as a time domain signal. The second wireless device 1710 may produce the first FMCW signal based on some or all of the information conveyed via the first, second, and third control messages. For example, the second wireless device 1710 may produce the first FMCW signal based on the set of FMCW parameters received via the second control message. The second wireless device 1710 may produce the first FMCW signal based on (e.g., in response to) transmitting the capability message, based on receiving any of the first through third control messages, or any combination thereof.

At stage 1740, the second wireless device 1710 may transmit the first FMCW signal to the first wireless device 1705 via the OFDM channel. The first wireless device 1705 may receive the first FMCW signal as an analog time domain signal via the OFDM channel.

At stage 1745, the first wireless device 1705 may produce a second FMCW signal, which may be referred to as a local signal in some examples herein. The first wireless device 1705 may produce the second FMCW signal based on the set of FMCW parameters that are associated with the first FMCW signal (e.g., as indicated via the second control message at 1725). For example, the first wireless device 1705 may produce the second FMCW signal based on a same starting frequency, slope, and bandwidth as the first FMCW signal, as described in further detail with respect to FIG. 16. Producing the second FMCW signal by the first wireless device 1705 may be based on one or more configured rules or procedures for FMCW-based OFDM channel estimation. For example, the second FMCW signal may be produced based on an FMCW function configured to support improved OFDM channel estimation.

At stage 1750, the first wireless device 1705 may estimate the OFDM channel based on the first and second FMCW signals. To estimate the frequency domain OFDM channel, the first wireless device 1705 may combine the first and second FMCW signals to produce a combined FMCW signal. The first wireless device 1705 may filter the combined FMCW signal (e.g., using an LPF). The first wireless device 1705 may sample the combined FMCW signal in a time domain using a sampling rate that is based on one or more parameters of the OFDM channel, such as a subband frequency range or size of the OFDM channel (e.g., $f_{subband}$). The first wireless device 1705 may sample the combined FMCW signal using an ADC, as described in further detail with respect to FIG. 16.

The first wireless device 1705 may estimate the frequency domain OFDM channel by estimating a respective value of the OFDM channel for each subband of multiple subbands in a frequency domain of the OFDM channel based on the sampling. For example, the sampling may produce a sampling sequence, where each value in the sampling sequence is associated with a respective subband of the OFDM channel. By adjusting the sampling rate used by the first wireless device 1705 based on the subband frequency range (e.g., a frequency estimation granularity), the first wireless device 1705 may change a quantity of subbands that are estimated (e.g., the first wireless device 1705 may make the frequency domain OFDM channel estimation more or less granular). The sampling rate used for sampling the combined and filtered FMCW signal may be relatively low (e.g., less than a sampling rate used to estimate OFDM channels based on OFDM signals), which may reduce processing complexity and power consumption at the device.

At stage 1755, the first wireless device 1705 and the second wireless device 1710 and may communicate OFDM signals via the OFDM channel based on the estimation of the frequency domain OFDM channel. For example, the first wireless device 1705 may transmit one or more follow-up data transmissions to the second wireless device 1710 after estimating the frequency domain OFDM channel. The follow-up data transmissions may be OFDM signals that indicate the channel estimation or other information associated with the estimation of the frequency domain OFDM channel. The first wireless device 1705 and the second wireless device 1710 may transmit and receive uplink data, downlink data, sidelink data, or any combination thereof, where the data may be conveyed via an OFDM signal.

FMCW-based frequency domain OFDM channel estimation techniques may provide for the first wireless device 1705 to reliably and accurately estimate a frequency domain OFDM channel using time domain signal processing and a relatively low sampling rate. By estimating the OFDM channel based on FMCW signals, the first wireless device 1705 may improve throughput, communication reliability, and coordination between devices while maintaining or reducing processing complexity, latency, and power consumption.

IMPLEMENTATION EXAMPLES

Implementation examples are provided in the following numbered clauses.

Clause 1. A user equipment (UE) comprising:
a memory;
a transceiver; and
a processor, communicatively coupled to the memory and the transceiver, configured to:
  transmit, via the transceiver, a capability message indicating a capability of the UE to perform antenna switching for radar signal transmission and for communication signal transmission;
  receive, via the transceiver from a network entity, a configuration message indicating a radar signal transmission configuration, or a communication signal transmission configuration, or a combination thereof; and
  transmit, via the transceiver, one or more outbound signals, the one or more outbound signals comprising a radar signal in accordance with the radar signal transmission configuration, or comprising a communication signal in accordance with the communication signal transmission configuration, or a combination thereof.

Clause 2. The UE of clause 1, wherein the capability message indicates one or more signal types comprising a radar signal type, a communication signal type, or a combination thereof.

Clause 3. The UE of clause 1, wherein the capability message indicates a minimum gap between consecutive ones of the one or more outbound signals that are joint channel sounding and radar sensing signals.

Clause 4. The UE of clause 3, wherein the capability message indicates waveform types of the consecutive ones of the one or more outbound signals.

Clause 5. The UE of clause 1, wherein the one or more outbound signals comprise a plurality of signal pairs each comprising a respective radar sensing signal and a respective channel sounding signal, and wherein the capability message indicates a minimum gap between the respective radar sensing signal and the respective channel sounding signal.

Clause 6. The UE of clause 5, wherein the capability message indicates that the minimum gap corresponds to waveform types of the respective radar sensing signal and the respective channel sounding signal, or antenna switching between the respective radar sensing signal and the respective channel sounding signal, or a combination thereof.

Clause 7. The UE of clause 1, wherein the one or more outbound signals comprise a plurality of signal pairs each comprising a respective radar sensing signal and a respective channel sounding signal, and wherein the capability message indicates a minimum gap between consecutive ones of the plurality of signal pairs.

Clause 8. The UE of clause 7, wherein the capability message indicates that the minimum gap corresponds to waveform types of the consecutive ones of the plurality of signal pairs, or antenna switching between the consecutive ones of the plurality of signal pairs, or a combination thereof.

Clause 9. The UE of clause 1, wherein the capability message indicates whether the UE supports radar sensing using antenna switching, and a timing gap between a sensing measurement and a sensing report.

Clause 10. The UE of clause 1, wherein the capability message indicates whether the UE supports antenna switching for Frequency Modulated Continuous Wave transmissions.

Clause 11. The UE of clause 1, wherein the capability message indicates whether the UE supports transmission of different waveform types in different symbols of a single occasion of a transmission resource.

Clause 12. The UE of clause 1, wherein the capability message indicates whether the UE is capable of transmitting a same signal type for both the radar signal and the communication signal.

Clause 13. A signal transfer method for communication, radar sensing, or a combination thereof, the signal transfer method comprising:
  transmitting, from a user equipment (UE), a capability message indicating a capability of the UE to perform antenna switching for radar signal transmission and for communication signal transmission;
  receiving, at the UE from a network entity, a configuration message indicating a radar signal transmission configuration, or a communication signal transmission configuration, or a combination thereof; and
  transmitting, from the UE, one or more outbound signals, the one or more outbound signals comprising a radar signal in accordance with the radar signal transmission configuration, or comprising a communication signal in accordance with the communication signal transmission configuration, or a combination thereof.

Clause 14. The signal transfer method of clause 13, wherein the capability message indicates one or more signal types comprising a radar signal type, a communication signal type, or a combination thereof.

Clause 15. The signal transfer method of clause 13, wherein the capability message indicates a minimum gap between consecutive ones of the one or more outbound signals that are joint channel sounding and radar sensing signals.

Clause 16. The signal transfer method of clause 15, wherein the capability message indicates waveform types of the consecutive ones of the one or more outbound signals.

Clause 17. The signal transfer method of clause 13, wherein the one or more outbound signals comprise a plurality of signal pairs each comprising a respective radar sensing signal and a respective channel sounding signal, and wherein the capability message indicates a minimum gap between the respective radar sensing signal and the respective channel sounding signal.

Clause 18. The signal transfer method of clause 17, wherein the capability message indicates that the minimum gap corresponds to waveform types of the respective radar sensing signal and the respective channel sounding signal, or antenna switching between the respective radar sensing signal and the respective channel sounding signal, or a combination thereof.

Clause 19. The signal transfer method of clause 13, wherein the one or more outbound signals comprise a plurality of signal pairs each comprising a respective radar sensing signal and a respective channel sounding signal, and wherein the capability message indicates a minimum gap between consecutive ones of the plurality of signal pairs.

Clause 20. The signal transfer method of clause 19, wherein the capability message indicates that the minimum gap corresponds to waveform types of the consecutive ones of the plurality of signal pairs, or antenna switching between the consecutive ones of the plurality of signal pairs, or a combination thereof.

Clause 21. The signal transfer method of clause 13, wherein the capability message indicates whether the UE supports radar sensing using antenna switching, and a timing gap between a sensing measurement and a sensing report.

Clause 22. The signal transfer method of clause 13, wherein the capability message indicates whether the UE supports antenna switching for Frequency Modulated Continuous Wave transmissions.

Clause 23. The signal transfer method of clause 13, wherein the capability message indicates whether the UE supports transmission of different waveform types in different symbols of a single occasion of a transmission resource.

Clause 24. The signal transfer method of clause 13, wherein the capability message indicates whether the UE is capable of transmitting a same signal type for both the radar signal and the communication signal.

Clause 25. A user equipment (UE) comprising:
means for transmitting a capability message indicating a capability of the UE to perform antenna switching for radar signal transmission and for communication signal transmission;
means for receiving, from a network entity, a configuration message indicating a radar signal transmission configuration, or a communication signal transmission configuration, or a combination thereof; and
means for transmitting one or more outbound signals, the one or more outbound signals comprising a radar signal in accordance with the radar signal transmission configuration, or comprising a communication signal in accordance with the communication signal transmission configuration, or a combination thereof.

Clause 26. The UE of clause 25, wherein the capability message indicates one or more signal types comprising a radar signal type, a communication signal type, or a combination thereof.

Clause 27. The UE of clause 25, wherein the capability message indicates a minimum gap between consecutive ones of the one or more outbound signals that are joint channel sounding and radar sensing signals.

Clause 28. The UE of clause 27, wherein the capability message indicates waveform types of the consecutive ones of the one or more outbound signals.

Clause 29. The UE of clause 25, wherein the one or more outbound signals comprise a plurality of signal pairs each comprising a respective radar sensing signal and a respective channel sounding signal, and wherein the capability message indicates a minimum gap between the respective radar sensing signal and the respective channel sounding signal.

Clause 30. The UE of clause 29, wherein the capability message indicates that the minimum gap corresponds to waveform types of the respective radar sensing signal and the respective channel sounding signal, or antenna switching between the respective radar sensing signal and the respective channel sounding signal, or a combination thereof.

Clause 31. The UE of clause 25, wherein the one or more outbound signals comprise a plurality of signal pairs each comprising a respective radar sensing signal and a respective channel sounding signal, and wherein the capability message indicates a minimum gap between consecutive ones of the plurality of signal pairs.

Clause 32. The UE of clause 31, wherein the capability message indicates that the minimum gap corresponds to waveform types of the consecutive ones of the plurality of signal pairs, or antenna switching between the consecutive ones of the plurality of signal pairs, or a combination thereof.

Clause 33. The UE of clause 25, wherein the capability message indicates whether the UE supports radar sensing using antenna switching, and a timing gap between a sensing measurement and a sensing report.

Clause 34. The UE of clause 25, wherein the capability message indicates whether the UE supports antenna switching for Frequency Modulated Continuous Wave transmissions.

Clause 35. The UE of clause 25, wherein the capability message indicates whether the UE supports transmission of different waveform types in different symbols of a single occasion of a transmission resource.

Clause 36. The UE of clause 25, wherein the capability message indicates whether the UE is capable of transmitting a same signal type for both the radar signal and the communication signal.

Clause 37. A non-transitory, processor-readable storage medium comprising processor-readable instructions to cause a processor of a user equipment (UE) to:
transmit a capability message indicating a capability of the UE to perform antenna switching for radar signal transmission and for communication signal transmission;
receive, from a network entity, a configuration message indicating a radar signal transmission configuration, or a communication signal transmission configuration, or a combination thereof; and
transmit one or more outbound signals, the one or more outbound signals comprising a radar signal in accordance with the radar signal transmission configuration, or comprising a communication signal in accordance with the communication signal transmission configuration, or a combination thereof.

Clause 38. The non-transitory, processor-readable storage medium of clause 37, wherein the capability message indicates one or more signal types comprising a radar signal type, a communication signal type, or a combination thereof.

Clause 39. The non-transitory, processor-readable storage medium of clause 37, wherein the capability message indicates a minimum gap between consecutive ones of the one or more outbound signals that are joint channel sounding and radar sensing signals.

Clause 40. The non-transitory, processor-readable storage medium of clause 39, wherein the capability message indicates waveform types of the consecutive ones of the one or more outbound signals.

Clause 41. The non-transitory, processor-readable storage medium of clause 37, wherein the one or more outbound signals comprise a plurality of signal pairs each comprising a respective radar sensing signal and a respective channel sounding signal, and wherein the capability message indicates a minimum gap between the respective radar sensing signal and the respective channel sounding signal.

Clause 42. The non-transitory, processor-readable storage medium of clause 41, wherein the capability message indicates that the minimum gap corresponds to waveform types of the respective radar sensing signal and the respective channel sounding signal, or antenna switching between the respective radar sensing signal and the respective channel sounding signal, or a combination thereof.

Clause 43. The non-transitory, processor-readable storage medium of clause 37, wherein the one or more outbound signals comprise a plurality of signal pairs each comprising a respective radar sensing signal and a respective channel sounding signal, and wherein the capability message indicates a minimum gap between consecutive ones of the plurality of signal pairs.

Clause 44. The non-transitory, processor-readable storage medium of clause 43, wherein the capability message indicates that the minimum gap corresponds to waveform types of the consecutive ones of the plurality of signal pairs, or antenna switching between the consecutive ones of the plurality of signal pairs, or a combination thereof.

Clause 45. The non-transitory, processor-readable storage medium of clause 37, wherein the capability message indicates whether the UE supports radar sensing using antenna switching, and a timing gap between a sensing measurement and a sensing report.

Clause 46. The non-transitory, processor-readable storage medium of clause 37, wherein the capability message indicates whether the UE supports antenna switching for Frequency Modulated Continuous Wave transmissions.

Clause 47. The non-transitory, processor-readable storage medium of clause 37, wherein the capability message indicates whether the UE supports transmission of different waveform types in different symbols of a single occasion of a transmission resource.

Clause 48. The non-transitory, processor-readable storage medium of clause 37, wherein the capability message indicates whether the UE is capable of transmitting a same signal type for both the radar signal and the communication signal.

Clause 49. A network entity comprising:

a memory;

a transceiver; and a processor, communicatively coupled to the memory and the transceiver, configured to:

receive, via the transceiver from a user equipment (UE), a capability message indicating a capability of the UE to perform antenna switching for radar signal transmission and for communication signal transmission; and transmit, via the transceiver to the UE, a configuration message indicating a radar signal transmission configuration, or a communication signal transmission configuration, or a combination thereof, the configuration message indicating antenna switching for different signal transmission configurations of the configuration message.

Clause 50. The network entity of clause 49, wherein the processor is configured to transmit the configuration message indicating one or more signal types comprising a radar signal type, a communication signal type, or a combination thereof, based on the capability message indicating the one or more signal types.

Clause 51. The network entity of clause 49, wherein the processor is configured to perform joint communication and bi-static radar sensing based on signal transmission from the UE.

Clause 52. The network entity of clause 49, wherein the processor is configured to transmit the configuration message indicating one or more timing configuration gaps that are each at least as long as one or more corresponding capability timing gaps indicated in the capability message for different signal transmissions by the UE.

Clause 53. The network entity of clause 49, wherein the processor is configured to transmit the configuration message indicating different waveform types for the different signal transmission configurations.

Clause 54. The network entity of clause 49, wherein the processor is configured to transmit the configuration message indicating a same signal type for both the radar signal transmission configuration and the communication signal transmission configuration.

Clause 55. A method for transmitting signal configuration information for communication, radar sensing, or a combination thereof, the method comprising:

receiving, at a network entity from a user equipment (UE), a capability message indicating a capability of the UE to perform antenna switching for radar signal transmission and for communication signal transmission; and transmitting, from the network entity to the UE, a configuration message indicating a radar signal transmission configuration, or a communication signal transmission configuration, or a combination thereof, the configuration message indicating antenna switching for different signal transmission configurations of the configuration message.

Clause 56. The method of clause 55, wherein the configuration message indicates one or more signal types comprising a radar signal type, a communication signal type, or a combination thereof, based on the capability message indicating the one or more signal types.

Clause 57. The method of clause 55, further comprising performing, at the network entity, joint communication and bi-static radar sensing based on signal transmission from the UE.

Clause 58. The method of clause 55, wherein the configuration message indicates one or more timing configuration gaps that are each at least as long as one or more corresponding capability timing gaps indicated in the capability message for different signal transmissions by the UE.

Clause 59. The method of clause 55, wherein the configuration message indicates different waveform types for the different signal transmission configurations.

Clause 60. The method of clause 55, wherein the configuration message indicates a same signal type for both the radar signal transmission configuration and the communication signal transmission configuration.

Clause 61. A network entity comprising:

means for receiving, from a user equipment (UE), a capability message indicating a capability of the UE to perform antenna switching for radar signal transmission and for communication signal transmission; and means for transmitting, to the UE, a configuration message indicating a radar signal transmission configuration, or a communication signal transmission configuration, or a combination thereof, the configuration message indicating antenna switching for different signal transmission configurations of the configuration message.

Clause 62. The network entity of clause 61, wherein the configuration message indicates one or more signal types comprising a radar signal type, a communication signal type, or a combination thereof, based on the capability message indicating the one or more signal types.

Clause 63. The network entity of clause 61, further comprising means for performing joint communication and bi-static radar sensing based on signal transmission from the UE.

Clause 64. The network entity of clause 61, wherein the configuration message indicates one or more timing configuration gaps that are each at least as long as one or more corresponding capability timing gaps indicated in the capability message for different signal transmissions by the UE.

Clause 65. The network entity of clause 61, wherein the configuration message indicates different waveform types for the different signal transmission configurations.

Clause 66. The network entity of clause 61, wherein the configuration message indicates a same signal type for both the radar signal transmission configuration and the communication signal transmission configuration.

Clause 67. A non-transitory, processor-readable storage medium comprising processor-readable instructions to cause a processor of a network entity to:

receive, from a user equipment (UE), a capability message indicating a capability of the UE to perform antenna switching for radar signal transmission and for communication signal transmission; and transmit, to the UE, a configuration message indicating a radar signal transmission configuration, or a communication signal transmission configuration, or a combination thereof, the configuration message indicating antenna switching for different signal transmission configurations of the configuration message.

Clause 68. The non-transitory, processor-readable storage medium of clause 67, wherein the configuration message indicates one or more signal types comprising a radar signal type, a communication signal type, or a combination thereof, based on the capability message indicating the one or more signal types.

Clause 69. The non-transitory, processor-readable storage medium of clause 67, further comprising processor-readable instructions to cause the processor to perform joint communication and bi-static radar sensing based on signal transmission from the UE.

Clause 70. The non-transitory, processor-readable storage medium of clause 67, wherein the configuration message indicates one or more timing configuration gaps that are each at least as long as one or more corresponding capability timing gaps indicated in the capability message for different signal transmissions by the UE.

Clause 71. The non-transitory, processor-readable storage medium of clause 67, wherein the configuration message indicates different waveform types for the different signal transmission configurations.

Clause 72. The non-transitory, processor-readable storage medium of clause 67, wherein the configuration message indicates a same signal type for both the radar signal transmission configuration and the communication signal transmission configuration.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a memory;
a transceiver; and
a processor, communicatively coupled to the memory and the transceiver, configured to:
transmit, via the transceiver, a capability message indicating a capability of the UE to perform antenna switching for radar signal transmission and for communication signal transmission, and indicating a gap between a respective set of two outbound signals, of a plurality of outbound signals, and corresponding waveform types of the two outbound signals;
receive, via the transceiver from a network entity, a configuration message indicating a radar signal transmission configuration, or a communication signal transmission configuration, or a combination thereof; and
transmit, via the transceiver, the plurality of outbound signals, each of the plurality of outbound signals comprising a radar signal in accordance with the radar signal transmission configuration, or comprising a communication signal in accordance with the communication signal transmission configuration, or a combination thereof.

2. The UE of claim 1, wherein the capability message indicates one or more signal types comprising a radar signal type, a communication signal type, or a combination thereof.

3. The UE of claim 1, wherein the gap is a minimum gap between consecutive ones of the one or more outbound signals that are joint channel sounding and radar sensing signals.

4. The UE of claim 1, wherein the plurality of outbound signals comprise a plurality of signal pairs each comprising a respective radar sensing signal and a respective channel sounding signal, and wherein the gap is a minimum gap between the respective radar sensing signal and the respective channel sounding signal.

5. The UE of claim 4, wherein the capability message indicates that the minimum gap corresponds to antenna switching between the respective radar sensing signal and the respective channel sounding signal.

6. The UE of claim 1, wherein the one or more outbound signals comprise a plurality of signal pairs each comprising a respective radar sensing signal and a respective channel sounding signal, and wherein the gap is a minimum gap between consecutive ones of the plurality of signal pairs.

7. The UE of claim 6, wherein the capability message indicates that the minimum gap corresponds to antenna switching between the consecutive ones of the plurality of signal pairs.

8. The UE of claim 1, wherein the gap is a first timing gap, and wherein the capability message indicates whether the UE supports radar sensing using antenna switching, and indicates a second timing gap between a sensing measurement and a sensing report.

9. The UE of claim 1, wherein the capability message indicates whether the UE supports antenna switching for Frequency Modulated Continuous Wave transmissions.

10. The UE of claim 1, wherein the capability message indicates whether the UE supports transmission of different waveform types in different symbols of a single occasion of a transmission resource.

11. The UE of claim 1, wherein the capability message indicates whether the UE is capable of transmitting a same signal type for both the radar signal and the communication signal.

12. A signal transfer method for communication, radar sensing, or a combination thereof, the signal transfer method comprising:

transmitting, from a user equipment (UE), a capability message indicating a capability of the UE to perform antenna switching for radar signal transmission and for communication signal transmission, and indicating a gap between a respective set of two outbound signals, of a plurality of outbound signals, and corresponding waveform types of the two outbound signals;

receiving, at the UE from a network entity, a configuration message indicating a radar signal transmission configuration, or a communication signal transmission configuration, or a combination thereof; and transmitting, from the UE, the plurality of outbound signals, each of the plurality of outbound signals comprising a radar signal in accordance with the radar signal transmission configuration, or comprising a communication signal in accordance with the communication signal transmission configuration, or a combination thereof.

13. The signal transfer method of claim 12, wherein the capability message indicates one or more signal types comprising a radar signal type, a communication signal type, or a combination thereof.

14. The signal transfer method of claim 12, wherein the gap is a minimum gap between consecutive ones of the one or more outbound signals that are joint channel sounding and radar sensing signals.

15. The signal transfer method of claim 12, wherein the plurality of outbound signals comprise a plurality of signal pairs each comprising a respective radar sensing signal and a respective channel sounding signal, and wherein the gap is a minimum gap between the respective radar sensing signal and the respective channel sounding signal.

16. The signal transfer method of claim 15, wherein the capability message indicates that the minimum gap corresponds to antenna switching between the respective radar sensing signal and the respective channel sounding signal.

17. The signal transfer method of claim 12, wherein the one or more outbound signals comprise a plurality of signal pairs each comprising a respective radar sensing signal and a respective channel sounding signal, and wherein the gap is a minimum gap between consecutive ones of the plurality of signal pairs.

18. The signal transfer method of claim 17, wherein the capability message indicates that the minimum gap corresponds to antenna switching between the consecutive ones of the plurality of signal pairs.

19. The signal transfer method of claim 12, wherein the gap is a first timing gap, and wherein the capability message indicates whether the UE supports radar sensing using antenna switching, and indicates a second timing gap between a sensing measurement and a sensing report.

20. The signal transfer method of claim 12, wherein the capability message indicates whether the UE supports antenna switching for Frequency Modulated Continuous Wave transmissions.

21. The signal transfer method of claim 12, wherein the capability message indicates whether the UE supports transmission of different waveform types in different symbols of a single occasion of a transmission resource.

22. The signal transfer method of claim 12, wherein the capability message indicates whether the UE is capable of transmitting a same signal type for both the radar signal and the communication signal.

23. A user equipment (UE) comprising:

means for transmitting a capability message indicating a capability of the UE to perform antenna switching for radar signal transmission and for communication signal transmission, and indicating a gap between a respective set of two outbound signals, of a plurality of outbound signals, and corresponding waveform types of the two outbound signals;

means for receiving, from a network entity, a configuration message indicating a radar signal transmission configuration, or a communication signal transmission configuration, or a combination thereof; and means for transmitting the plurality of outbound signals, each of the plurality of outbound signals comprising a radar signal in accordance with the radar signal transmission configuration, or comprising a communication signal in accordance with the communication signal transmission configuration, or a combination thereof.

24. The UE of claim 23, wherein the capability message indicates one or more signal types comprising a radar signal type, a communication signal type, or a combination thereof.

25. The UE of claim 23, wherein the gap is a minimum gap between consecutive ones of the one or more outbound signals that are joint channel sounding and radar sensing signals.

26. The UE of claim 23, wherein the plurality of outbound signals comprise a plurality of signal pairs each comprising a respective radar sensing signal and a respective channel sounding signal, and wherein the gap is a minimum gap between the respective radar sensing signal and the respective channel sounding signal.

27. A non-transitory, processor-readable storage medium comprising processor-readable instructions to cause a processor of a user equipment (UE) to:

transmit a capability message indicating a capability of the UE to perform antenna switching for radar signal transmission and for communication signal transmission, and indicating a gap between a respective set of two outbound signals, of a plurality of outbound signals, and corresponding waveform types of the two outbound signals;

receive, from a network entity, a configuration message indicating a radar signal transmission configuration, or a communication signal transmission configuration, or a combination thereof; and transmit the plurality of outbound signals, each of the plurality of outbound signals comprising a radar signal in accordance with the radar signal transmission configuration, or comprising a communication signal in accordance with the communication signal transmission configuration, or a combination thereof.

\* \* \* \* \*